US011862448B2

(12) United States Patent
Jarrold et al.

(10) Patent No.: US 11,862,448 B2
(45) Date of Patent: *Jan. 2, 2024

(54) INSTRUMENT, INCLUDING AN ELECTROSTATIC LINEAR ION TRAP WITH CHARGE DETECTOR RESET OR CALIBRATION, FOR SEPARATING IONS

(71) Applicant: THE TRUSTEES OF INDIANA UNIVERSITY, Bloomington, IN (US)

(72) Inventors: Martin F. Jarrold, Bloomington, IN (US); Andrew W. Alexander, Bloomington, IN (US); Aaron R. Todd, Bloomington, IN (US)

(73) Assignee: THE TRUSTEES OF INDIANA UNIVERSITY, Bloomington, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/149,743

(22) Filed: Jan. 4, 2023

(65) Prior Publication Data

US 2023/0154736 A1 May 18, 2023

Related U.S. Application Data

(60) Continuation of application No. 17/468,841, filed on Sep. 8, 2021, now Pat. No. 11,594,405, which is a (Continued)

(51) Int. Cl.

| | |
|---|---|
| ***H01J 49/02*** | (2006.01) |
| ***H01J 49/42*** | (2006.01) |
| ***H01J 49/00*** | (2006.01) |

(52) U.S. Cl.

CPC ........ *H01J 49/025* (2013.01); *H01J 49/0009* (2013.01); *H01J 49/022* (2013.01); *H01J 49/4245* (2013.01)

(58) Field of Classification Search

CPC ........ H01J 49/02; H01J 49/025; H01J 49/027; H01J 49/42; H01J 49/4245; H01J 49/4255

See application file for complete search history.

(56) References Cited

U.S. PATENT DOCUMENTS 3,019,168 A 1/1962 Taylor
5,285,063 A 2/1994 Schwartz et al.
(Continued)

FOREIGN PATENT DOCUMENTS

JP 11144675 5/1999
JP 2008186730 A 8/2008
(Continued)

OTHER PUBLICATIONS

Kiefer, David, "Charge Detection Mass Spectrometry with Almost Perfect Charge Accuracy", Anal. Chem. vol. 87, No. 20, 2015, p. 10330-10337 (Year: 2016).*
(Continued)

*Primary Examiner* — David E Smith
(74) *Attorney, Agent, or Firm* — Barnes & Thornburg LLP

(57) ABSTRACT

A CDMS may include an ion source to generate ions from a sample, a mass spectrometer to separate the generated ions as a function of ion mass-to-charge ratio, an electrostatic linear ion trap (ELIT) having a charge detection cylinder disposed between first and second ion mirrors, wherein ions exiting the mass spectrometer are supplied to the ELIT, a charge generator for generating free charges, a field free region between the charge generator and the charge detection cylinder, and a processor configured to control the charge generator, with no ions in the charge detection cylinder, to generate a target number of free charges and cause the target number of free charges to travel across the field-free region and into contact with the charge detection (Continued)

cylinder to deposit the target number of free charges thereon and thereby calibrate or reset the charge detection cylinder to a corresponding target charge level.

23 Claims, 9 Drawing Sheets

Related U.S. Application Data division of application No. 17/058,553, filed as application No. PCT/US2019/035381 on Jun. 4, 2019, now Pat. No. 11,177,122, and a continuation-in-part of application No. PCT/US2019/013284, filed on Jan. 11, 2019.

(60) Provisional application No. 62/680,272, filed on Jun. 4, 2018.

(56) References Cited

U.S. PATENT DOCUMENTS

| | | | | |
|---|---|---|---|---|
| 5,478,745 | A | 12/1995 | Samulski | |
| 5,572,025 | A | 11/1996 | Cotter | |
| 5,770,857 | A | 6/1998 | Fuerstenau et al. | |
| 5,863,541 | A | 1/1999 | Samulski et al. | |
| 5,869,248 | A | 2/1999 | Yuan et al. | |
| 5,877,022 | A | 3/1999 | Stinchcomb et al. | |
| 5,880,466 | A * | 3/1999 | Benner | H01J 49/04 250/397 |
| 5,882,652 | A | 3/1999 | Valdes et al. | |
| 5,886,346 | A | 3/1999 | Makarov | |
| 5,905,040 | A | 5/1999 | Mazzara et al. | |
| 5,916,563 | A | 6/1999 | Young et al. | |
| 5,965,358 | A | 10/1999 | Carrion et al. | |
| 6,013,487 | A | 1/2000 | Mitchell | |
| 6,083,702 | A | 7/2000 | Mitchell et al. | |
| 6,156,303 | A | 12/2000 | Russell et al. | |
| 6,183,950 | B1 | 2/2001 | Madonna | |
| 6,583,408 | B2 | 6/2003 | Smith et al. | |
| 6,744,042 | B2 * | 6/2004 | Zajfman | H01J 49/4245 250/281 |
| 6,753,523 | B1 | 6/2004 | Whitehouse | |
| 6,888,130 | B1 * | 5/2005 | Gonin | H01J 49/0095 250/281 |
| 7,314,912 | B1 | 1/2008 | Hallek et al. | |
| 7,829,842 | B2 | 11/2010 | Makarov | |
| 8,294,085 | B2 * | 10/2012 | Ding | H01J 49/0036 250/397 |
| 8,395,112 | B1 | 3/2013 | Bier | |
| 8,409,870 | B2 | 4/2013 | Wujickhuijse | |
| 8,766,170 | B2 | 7/2014 | Guna et al. | |
| 9,095,793 | B2 | 8/2015 | Flagan | |
| 10,056,244 | B1 | 8/2018 | Quarmby et al. | |
| 11,177,122 | B2 * | 11/2021 | Jarrold | H01J 49/027 |
| 11,257,665 | B2 | 2/2022 | Jarrold et al. | |
| 2002/0185606 | A1 | 12/2002 | Smith et al. | |
| 2003/0155502 | A1 | 8/2003 | Grosshans et al. | |
| 2004/0169137 | A1 | 9/2004 | Westphall et al. | |
| 2005/0236375 | A1 | 10/2005 | Gefter et al. | |
| 2007/0102634 | A1 * | 5/2007 | Frey | H01J 49/165 250/288 |
| 2007/0254352 | A1 | 11/2007 | Schaffer et al. | |
| 2009/0020694 | A1 | 1/2009 | Florey | |
| 2009/0078866 | A1 | 3/2009 | Li et al. | |
| 2009/0108194 | A1 | 4/2009 | Page et al. | |
| 2009/0294641 | A1 * | 12/2009 | Konicek | H01J 49/4225 250/281 |
| 2010/0084549 | A1 | 4/2010 | Ermakov et al. | |
| 2010/0084552 | A1 | 4/2010 | Kawana | |
| 2010/0090102 | A1 | 4/2010 | Rather et al. | |
| 2010/0227310 | A1 | 9/2010 | Manalis et al. | |
| 2010/0234837 | A1 | 9/2010 | Alfano | |
| 2010/0314538 | A1 | 12/2010 | Makarov et al. | |
| 2010/0320377 | A1 | 12/2010 | Cotter | |
| 2011/0095175 | A1 | 4/2011 | Bateman | |
| 2011/0240845 | A1 | 10/2011 | Ding | |
| 2012/0112056 | A1 | 5/2012 | Brucker et al. | |
| 2012/0282641 | A1 | 11/2012 | Reilly et al. | |
| 2013/0124099 | A1 | 5/2013 | Ecker et al. | |
| 2013/0175440 | A1 | 7/2013 | Perelman et al. | |
| 2013/0200261 | A1 | 8/2013 | Mizutani et al. | |
| 2013/0234017 | A1 | 9/2013 | Kaltashov et al. | |
| 2013/0327934 | A1 | 12/2013 | Makarov et al. | |
| 2014/0197333 | A1 | 7/2014 | Jolliffe et al. | |
| 2014/0346344 | A1 | 11/2014 | Chen | |
| 2015/0008316 | A1 | 1/2015 | Guna | |
| 2015/0021472 | A1 | 1/2015 | Makarov | |
| 2015/0325425 | A1 | 11/2015 | Makarov | |
| 2015/0331000 | A1 | 11/2015 | Collier et al. | |
| 2016/0005580 | A1 | 1/2016 | Grinfeld | |
| 2016/0035556 | A1 | 2/2016 | Berkout et al. | |
| 2016/0181084 | A1 | 6/2016 | Smith | |
| 2016/0336165 | A1 | 11/2016 | Guna | |
| 2017/0040152 | A1 | 2/2017 | Makarov | |
| 2017/0307565 | A1 | 10/2017 | Clemmer et al. | |
| 2017/0372883 | A1 | 12/2017 | Verenchikov | |
| 2020/0243317 | A1 | 7/2020 | Lopez-Hilfiker et al. | |
| 2020/0357626 | A1 | 11/2020 | Jarrold et al. | |
| 2021/0217606 | A1 | 7/2021 | Jarrold et al. | |

FOREIGN PATENT DOCUMENTS

| | | | |
|---|---|---|---|
| JP | 2011523172 | A | 8/2011 |
| JP | 2014501429 | A | 1/2014 |
| WO | 1998011244 | A1 | 3/1998 |
| WO | 1999061601 | A1 | 12/1999 |
| WO | 2000028004 | A1 | 5/2000 |
| WO | 2000028061 | A1 | 5/2000 |
| WO | 2001092551 | A2 | 5/2001 |
| WO | 2003042704 | A1 | 5/2003 |
| WO | 2006130474 | A2 | 12/2006 |
| WO | 2010135830 | A1 | 12/2010 |
| WO | 2012080352 | A1 | 6/2012 |
| WO | 2012083031 | A1 | 6/2012 |
| WO | 2012145037 | A1 | 10/2012 |
| WO | 2016073850 | A1 | 5/2016 |
| WO | 2017162779 | A1 | 9/2017 |
| WO | 2017190031 | A1 | 11/2017 |
| WO | 2019118242 | A1 | 6/2019 |
| WO | 2019140233 | A1 | 7/2019 |
| WO | 2019/236142 | A1 | 12/2019 |
| WO | 2019231854 | A1 | 12/2019 |
| WO | 2020/117292 | A1 | 6/2020 |
| WO | 2020/219527 | A1 | 10/2020 |
| WO | 2021/158676 | A1 | 8/2021 |

OTHER PUBLICATIONS

PCT International Search Report and Written Opinion completed by the ISA/US dated Oct. 11, 2021 and issued in connection with PCT/US2021/034480.

Fernandez-Maestre et al. "Ammonia as a Modifier in Ion Mobility Spectrometry: Effects in Ion Mobilities and Potential as a Separation Tool", J. Chil. Chem. Soc. 2014. 59, No. 1, especially: abstract; p. 2398, col. 1, para 1; p. 2398, col. 1, para 2; p. 2398, col. 2, para 2; p. 2399, Figure 1; p. 2402, col. 1, para 1; p. 2402, col. 2, para 1; Figure 6a. Figure 6b.

Kafle et al. "Understanding gas phase modifier interactions in rapid analysis by Differential Mobility-Tandem Mass Spectrometry", J Am Soc Mass Spectrom. 2014. 25(7): pp. 1098-1113, especially: p. 7, para 2; p. 10, para 5; p. 11, para 1.

Kiss et al. "Size, weight and position: ion mobility spectrometry and imaging MS combined", Anal Bioanal Chem. 2011. 399: pp. 2623-2634, especially: p. 2626, col. 1, para 1.

Japanese Office Action dated Jan. 31, 2023 for co-pending application 2020-568364—9 pages.

Chiorini, John A., et al. "Cloning of Adeno-Associated Virus Type 4 (MV4) and Generation of Recombinant MV4 Particles", Journal of Virology, vol. 71, pp. 6823-6833 (Sep. 1997).

(56) References Cited

OTHER PUBLICATIONS

Chiorini, John A., "Cloning and Characterization of Adeno-Associated Virus Type 5", Journal of Virology, vol. 73, DP-1309-1319 (Feb. 1999).
Chernushevich, et al., Collisional cooling of large ions in electrospray mass spectrometry. Anal. Chem 76. H54-1760 (2004).
Cleves, Ann E., "Protein transport: The nonclassical ins and outs", Current Biology, vol. 7, No. 5, pp. 318-320 (1997).
Contino, Nathan Colby, "Ion trap charge detection mass spectrometry: Lowering limits of detection and improving signal to noise", ISBN: 9781303535048, Jul. 30, 2013 (Jul. 30, 2013).
Ding, et al., A simulation study of the digital ion trap mass spectrometer. Int. J. Mass Spectrom. 221, 117-138 (2002).
Ding, et al, A digital ion trap mass spectrometer coupled with atmospheric pressure ion sources. J_ Mass Spectrom. 69, 471-484 (2004).
Douglas J_ Linear quadrupoles in mass spectrometry. Mass Spectrom. Rev. 28, 937-960 (2009).
Doussineau, Tristan, et al. "Infrared multiphoton dissociation tandem charge detection-mass spectrometry of single megadalton electrosprayed ions", Review of Scientific Instruments, AIP, Melville, NY, US, vol. 82, No. 8, Aug. 1, 2011, pp. 84104-84104.
Draper, Benjamin E., et al. "The FUNPET—a New Hybrid Ion Funnel-Ion Carpet Atmospheric Pressure Interface for the Simultaneous Transmission of a Broad Mass Range", Journal of the American Society for Mass Spectrometry, Elsevier Science Inc, US, vol. 29, No. 11, Aug. 15, 2018, pp. 2160-2172.
Draper, Benjamin E., et al., "Real-Time Analysis and Signal Optimization for Charge Detection Mass Spectrometry", J. Am. Soc. Mass Spectrom. (2019) 30:898Y904.
El-Baba, Tarick J. et al., "Melting proteins confined in nanodroplets with 10.6 [mu]m light provides clues about early steps of denaturation", Chemical Communications, vol. 54, No. 26, Mar. 8, 2018 (Mar. 8, 2018), p. 3270-3273.
Elliott, Andrew G., et al. "Simultaneous Measurements of Mass and Collisional Cross-Section of Single Ions with charge Detection Mass Spectrometry", Analytical Chemistry, vol. 89, No. 14, Jun. 16, 2017, pp. 7701-7708.
Elliott, Andrew G., et al. "Single Particle Analyzer of Mass: A Charge Detection Mass Spectrometer with a Multi-Detector Electrostatic Ion Trap", International Journal of Mass Spectrometry, Elsevier Science Publishers, Amsterdam, NL, vol. 414, Jan. 15, 2017, pp. 45-55.
Elliott, Andrew G., et al. "Effects of Individual Ion Energies on Charge Measurements in Fourier Transform Charge Detection Mass Spectrometry (FT-CDMS)", Journal of the American Society for Mass Spectrometry., Nov. 14, 2018 (Nov. 14, 2018).
Emerson, S., et al. "Hepatitis E Virus", Virology, vol. 2, Chapter 70; (4th ed., Lippincott-Raven Publishers).
Fields, Bernard, et al. "Parvoviridae: The Viruses and Their Replication" Virology, vol. 2, Chapter 69, pp. 2327-2359; 4th ed., Lippincott-Raven Publishers).
Fuerstenau, et al., "Mass Spectrometry of an Intact Virus", Agnew. Chem. 2001, 559-562.
Gao, Guangping, et al. "Clades of Adeno-Associated Viruses Are Widely Disseminated in Human Tissues", vol. 78, pp. 6381-6388 (Jun. 2004).
Gao, Guangping, et al. "Novel Adeno-Associated Viruses from Rhesus Monkeys as Vectors for Human Gene Therap",.; National Academy of Sciences, vol. 99, No. 18, pp. 11854-11859 (Sep. 3, 2002).
Gorman, Linda, et al. "Stable Alteration of Pre-mRNA Splicing Patterns by Modified U7 Small Nuclear RNAs", National Academy of Sciences, vol. 95, No. 9, pp. 4929-4934 (Apr. 28, 1998).
Grifman, M., et al. "Incorporation of Tumor-Targeting Peptides into Recombinant Adeno-associated Virus Capsids",.; Molecular Therapy, vol. 3, No. 6, pp. 964-975 (Jun. 2001).
Grinfeld, Dmitry, et al. "Space-Charge Effects in An Electrostatic Multireflection Ion Trap", European Journal of Mass Spectrometry, vol. 20, No. 2, Apr. 1, 2014 (Apr. 1, 2014), p. 131-142.
Hauck, B., et al. "Characterization of Tissue Tropism Determinants of Adeno-Associated Virus Type 1", Journal of Virology, vol. 77, No. 4, pp. 2768-2774 (Feb. 2003).
Heller, Manfred, et al. "Mass spectrometry-based analytical tools for the molecular protein characterization of human plasma lipoproteins", Proteomics, vol. 5, No. 19, Jul. 1 (205-97-91) , pp. 2619-2639.
Hogan, Joanna, et al. "Optimized Electrostatic Linear Ion Trap for Charge Detection Mass Spectrometry", Jul. 9, 2018 (Jul. 9, 2018), vol. 29, No. 10, p. 2086-2095.
Hutchins, Patrick M., et al. "Quantification of HDL Particle Concentration by Calibrated Ion Mobility Analysis", Clinical Chemistry 60:11, 1393-1401, 2014.
Keifer, David Z., "Single-Molecule Mass Spectrometry", Mass Spectrometry Reviews, vol. 36 pp. 715-733 (2017).
Keifer, David Z., et al. "Charge detection mass spectrometry: weighing heavier things" The Analyst, vol. 142, No. 10, Jan. 1, 2017, pp. 1654-1671.
Keifer, David Z., et al. "Charge Detection Mass Spectrometry with Almost Perfect Charge Accuracy", Analytical Chemistry, vol. 87, No. 20, Oct. 20, 2015, pp. 10330-10337.
Keifer, David et al., "Charge Detection Mass Spectrometry of Bacteriophage P22 Procapsid Distributions Above 20MDa", Rapid Communications in Mass Spectrometry, vol. 28, No. 5.
Kelly, Ryan T., et al. "The ion funnel: Theory, implementations, and applications", Mass Spectrometry Reviews., vol. 29, Apr. 23, 2009, pp. 294-312.
Kim et al., A multicapillary inlet jet disruption electrodynamic ion funnel interface for improved sensitivity using atmospheric pressure ion sources. Anal. Chem. 73, 4162-4170 (2001).
Koizumi et al., A novel phase-coherent programmable clock for high-precision arbitrary waveform generation applied o digital ion trap mass spectrometry_ Int. J_ Mass Spectrom_ 292, 23-31 (2010).
Konenkov et al., Matrix methods for the calculation of stability diagrams in quadrupole mass spectrometry. J. Amer. Soc. Mass Spec. 13, 597-613 (2002).
Kosaka, Nobuyoshi, et al., "Versatile roles of extracellular vesicles in cancer," J Clin Invest. 2016;126(4):1163-1172. https://doi.org/10.1172/JCI81130.
Kukreja, Alexander A., et al. "Structurally Similar Woodchuck and Human Hepadnavirus Core Proteins Having Distinctly Different Temperature Dependencies of Assembly" Journal of Virology, vol. 68, No. 24, 14105-14115, Sep. 24, 2014.
Landais et al., Varying the radio frequency: A new scanning mode for quadrupole analyzers. Rapid Commun. Mass Spectrom. 12, 302-306 (1998).
Makarov, Alexander, "Electrostatic Axially Harmonic Orbital Trapping: A High-Performance Technique of Mass Analysis", Analytical Chemistry, vol. 72, No. 6, Mar. 1, 2000 (Mar. 1, 2000), p. 1156-1162.
Marmet et al., A frequency-swept quadrupole mass filler. Int. J_ Mass Spectrom. Ion Proc. 42, 3-10 (1982).
Martin, Stability of doubly charged alkali halide clusters. J_ Chem. Phys. 76, 5467-5469 (1982).
Miyamura, K., et al. "Parvovirus Particles as Platforms for Protein Presentation", National Academy of Sciences, vol. 1, No. 18, pp. 8507-8511 (Aug. 30, 1994).
Mori, Seiichiro, Mori, et al. "Two novel adeno-associated viruses from cynomolgus monkey: pseudotyping characterization of capsid protein", Virology 330, pp. 375-383 (2004).
Muramatsu, S., et al. "Nucleotide Sequencing and Generation of an Infectious Clone of Adeno-Associated Virus 3", Virology vol. 221; Article No. 0367; pp. 208-217 (1996).
Muzyczka, N., "Use of Adeno-Associated Virus as a General Transduction Vector for Mammalian Cells", Current Topics n Microbiology and Immunology, vol. 158, pp. 97-129 (1992).
Nie et al., Frequency scan of a quadrupole mass analyzer in the third stability region for protein analysis. J. Chin. Chem_ Soc., 53, 47-52 (2006).
Padron, Eric, et al. "Structure of Adeno-Associated Virus Type 4", Journal of Virology, vol. 79, No. 8, pp. 5047-5058 Apr. 2005).

(56) References Cited

OTHER PUBLICATIONS

Puttaraju, M., et al. "Spliceosome-mediated RNA trans-splicing as a tool for gene therapy", Nature Biotechnology, vol. 17, pp. 246-252 (Mar. 1999).
Japanese Office Action dated Jan. 24, 2023 for co-pending application 2021-527871—4 pages (Prior art reference Alexander Makarov has been previously submitted).
Paul et al., Das elektrische massenfilter als massenspektromeler und isotopenlrenner. Z. Phys. 152, 143-182 (1958).
Paul, et al., Das elektrische massenfiller, Z. Phys. 140, 262-273 (1955).
Pierson, Elizabeth E., et al., Charge Detection Mass Spectrometry for Single Ions with an Uncertainty in the Charge Measurement of 0.65 e; Elizabeth E_ Pierson et al.; Journal American Society for Mass Spectrometry, vol. 26, pp. 1213-1220 (2015).
Pierson, Elizabeth E., et al. "Charge Detection Mass Spectrometry Identifies Preferred Non-icosahedral Polymorphs in the Self-Assembly of Woodchuck Hepatitis Virus Capsids", Jour. of Molecular Biology, vol. 428, Issue 2, pp. 292-300. Jan. 29, 2016.
Pierson, Elizabeth E., et al., "Detection of 1-15 Late Intermediates in Virus Capsid Assembly by Charge Detection Mass Spectrometry", Journal of the American Chemical Society, vol. 136, No. 9, Feb. 19, 2014, 3536-3541.
Pierson, Elizabeth, "Charge Detection Mass Spectrometry: Instrumentation & Applications to Viruses", Proquest Dissertations and Theses; Thesis (Ph.D.) vol. 76-09(E), Section: B. 168.
Richards et al., A new operating mode for the quadrupole mass filler. Int. J. Mass Spectrom. Ion Phys. 12, 317-339 1973).
Richards et al., Waveform parameter tolerances for the quadrupole mass filler with rectangular excitation. Int. J. Mass Spectrom. Ion Phys_ 15, 417-428 (1974).
Schlunegger et al., Frequency scan for the analysis of high mass ions generated by matrix-assisted laser esorption/ionization in a Paul trap_ Rapid Commun. Mass Spectrom. 13, 1792-1796 (1999).
Sonalikar, Hrishikesh S., et al. "Numerical analysis of segmented-electrode Orbitraps", International Journal of Mass Spectrometry, Elsevier Science Publishers, Amsterdam, NL, vol. 395, Dec. 17, 2015 (Dec. 17, 2015), p. 36-48.
Shinholt, Deven L., et al., "A Frequency and Amplitude Scanned Quadrupole Mass Filter for the Analysis of High m/z Ions", Review of Scientific Instruments 85, 113109 (2014) (Received Sep. 11, 2014; accepted Oct. 17, 2014; published online Nov. 21, 2014).
Snijder, J., et al., "Defining the Stoichiometry and Cargo Load of Viral and Bacterial Nanoparticles by Orbitrap Mass Spectrometry", J. Am. Chem. Soc. 2014, 136, 7295-7299.
Sobott et al., A tandem mass spectrometer for improved transmission and analysis of large macromolecular Assemblies. Anal. Chem. 74, 1402-1407 (2002).
Syed, et al., Quadrupole mass filler: Design and performance for operation in stability zone 3. J. Am. Soc. Mass Spectrom. 24, 1493-1500 (2013).
Shade, Rosemary, et al. "Nucleotide Sequence and Genome Organization of Human Parvovirus B19 Isolated from the Serum of a Child during plastic Crisis", Journal of Virology, vol. 58, No. 3, pp. 921-936 (Jun. 1986).
Sharp, Phillip A., et al. "RNA Interference", American Association for the Advancement of Science; Science, New Series, vol. 287, No. 5462, pp. 2431-2433 (Mar. 31, 2000).
Shi, Z., et al. "Insertional Mutagenesis at Positions 520 and 584 of Adena-Associated Virus Type 2 (MV2) Capsid Gene and Generation of MV2 Vectors with Eliminated Heparin-Binding Ability and Introduced Novel Tropism", Human Gene Therapy, vol. 17, pp. 353-361 (Mar. 2006).
Srivastava, Arun, et al., "Nucleotide Sequence and Organization of the Adena-Associated Virus 2 Genome", Journal of Virology, vol. 45, No. 2, pp. 555-564 (Feb. 1983).
Tsao, Jun, et al., "The Three-Dimensional Structure of Canine Parvovirus and Its Functional Implications", American Association for the Advancement of Science, Science, New Series, vol. 251, No. 5000, pp. 1456-1464 (Mar. 22, 1991).
Todd, Aaron R., et al. "Implementation of a Charge-Sensitive Amplifier without a Feedback Resistor for Charge Detection Mass Spectrometry Reduces Noise and Enables Detection of Individual Ions Carrying a Single Charge", J. Am. Soc. Mass Spectrom. 2020, 31, 146-154.
Walters, Robert W., "Structure of Adeno-Associated Virus Serotype 5", Journal of Virology, vol. 78, No. 7, pp. 3361-3371 (Apr. 2004).
Winger, Brian E., et al., "Observation and Implications of High Mass-to-Charge Ratio Ions from Electrospray Ionization Mass Spectrometry," 1993 American Society for Mass Spectrometry 4, 536-545.
Wang, Lei, et al., "Expanding the Genetic Code", Annual Review of Biophysics and Biomolecular Structure, vol. 35, pp. 25-249 (2006).
Weiss, Victor U., et al., "Analysis of a Common Cold Virus and Its Subviral Particles by Gas-Phase Electrophoretic Mobility Molecular Analysis and Native Mass Spectrometry", Anal Chem. 2015.
Wright, J. Fraser, "Product-Related Impurities in Clinical-Grade Recombinant AAV Vectors: Characterization and Risk Assessment", Biomedicines 2014, 2, 80-97.
Xie, Qing, et al., "Canine Parvovirus Capsid Structure, Analyzed at 2.9 A Resolution", Journal of Molecular Biology, vol. 64, pp. 497-520 (1996).
Xie, Qing, et al., "The atomic structure of adeno-associated virus (MV-2), a vector for human gene therapy", PNAS, vol. 99, No. 16, pp. 10405-10410 (Aug. 6, 2002).
Xiao, Weidong, et al., "Gene Therapy Vectors Based on Adena-Associated Virus Type 1", Journal of Virology, vol. 73, No. 5, pp. 3994-4003 (May 1999).
Uetrecht et al., "Stability and Shape of Hepatitis B Virus Capsids In Vacuo", Angew. Chem. Int. Ed. 2008, 47, 6247-6251.
Uetrecht et al., "High-resolution mass spectrometry of viral assemblies: Molecular composition and stability of dimorphic hepatitis B virus capsids", PNAS 2008, vol. 105, 9216-9920.
Xiong, et al., The development of charge detection-quadrupole ion trap mass spectrometry driven by rectangular and riangularwaves, Analyst 137, 1199-1204 (2012).
Yang, et al., Development of a palm portable mass spectrometer. J. Amer. Soc. Mass Spec. 19, 1442-1448 (2008).
Yost, et al., Selected ion fragmentation with a tandem quadrupole mass spectrometer. J. Am. Chem. Soc. 100, 274-2275 (1978).
Bioconjugate Techniques; Hermanson;Academic Press, 1st Edition (1996), (book reference, chapter guide attached; book/specific chapter(s) to be made available upon request).
European Office Action dated Sep. 2, 2021 for application 19 707 901.5—5 pages.
European Office Action dated Sep. 9, 2022 for application 19 702 775.8—5 pages.
European Office Action dated Sep. 9, 2022 for application 19 702 771.7—5 pages.
Examination report No. 1 dated Oct. 21, 2022 in Australian Application No. 2019281255—4 pages.
PCT International Search Report and Written Opinion completed by the ISA/US dated Aug. 22, 2026 issued in connection with PCT/US2022/073503.
European Office Action dated Nov. 23, 2022 for application 19 702 773.3—5 pages.
PCT International Search Report and Written Opinion completed by the ISA/US dated Jan. 12, 2016 and issued in connection with PCT/US2015/059463.
PCT International Search Report and Written Opinion completed by the ISA/US dated Jun. 19, 2017 and issued in connection with PCT/US2017/030163.
PCT International Search Report and Written Opinion completed by the ISA/EP dated Feb. 14, 2019 and issued in connection with PCT/US2018/051944.
PCT International Search Report and Written Opinion completed by the ISA/EP dated Apr. 18, 2019 and issued in connection with PCT/US2019/013251.
PCT International Search Report and Written Opinion completed by the ISA/EP dated Apr. 16, 2019 and issued in connection with PCT/US2019/013274.

(56) References Cited

OTHER PUBLICATIONS

PCT International Search Report and Written Opinion completed by the ISA/EP dated Mar. 27, 2019 and issued in connection with PCT/US2019/013277.
PCT International Search Report and Written Opinion completed by the ISA/EP dated Jul. 24, 2019 and issued in connection with PCT/US2019/013278.
PCT International Search Report and Written Opinion completed by the ISA/EP dated Sep. 9, 2019 and issued in connection with PCT/US2019/013279.
PCT International Search Report and Written Opinion completed by the ISA/EP dated Mar. 28, 2019 and issued in connection with PCT/US2019/013280.
PCT International Search Report and Written Opinion completed by the ISA/EP dated Aug. 27, 2019 and issued in connection with PCT/US2019/013281.
PCT International Search Report and Written Opinion completed by the ISA/EP dated Mar. 27, 2019 and issued in connection with PCT/US2019/013283.
PCT International Search Report and Written Opinion completed by the ISA/EP dated Mar. 29, 2019 and issued in connection with PCT/US2019/013284.
PCT International Search Report and Written Opinion completed by the ISA/EP dated Jul. 26, 2019 and issued in connection with PCT/US2019/013285.
PCT International Search Report and Written Opinion completed by the ISA/EP dated Aug. 27, 2019 and issued in connection with PCT/US2019/035381.
PCT International Search Report and Written Opinion completed by the ISA/EP dated Sep. 9, 2019 and issued in connection with PCT/US2019/035379.
PCT International Search Report and Written Opinion completed by the ISA/US dated Jan. 24, 2021 and issued in connection with PCT/US2020/054975.
PCT International Search Report and Written Opinion completed by the ISA/EP dated Mar. 8, 2021 and issued in connection with PCT/US2020/065300.
PCT International Search Report and Written Opinion completed by the ISA/EP dated Mar. 8, 2021 and issued in connection with PCT/US2020/065301.
PCT International Search Report and Written Opinion completed by the ISA/US dated Mar. 18, 2021 and issued in connection with PCT/US2021/016325.
PCT International Search Report and Written Opinion completed by the ISA/US dated Apr. 5, 2021 and issued in connection with PCT/US2021/016435.
PCT International Search Report and Written Opinion completed by the ISA/US dated Nov. 23, 2020 and issued in connection with PCT/US2020/052009.
PCT International Search Report and Written Opinion completed by the ISA/EP dated Jul. 14, 2020 and issued in connection with PCT/US2020/029287.
Supplemental European Search Report for European Patent Application No. 17790559.3 dated Nov. 12, 2019 (11 pages).
Anthony, Staci N. "MS /MS instrumentation for megadalton-sized ions", 2016, XP055619426, ISBN: 978-1-369-02558-3 Retrieved from the Internet: URL:https://search.proquest.com/docview/1830450391?accountid=29404.
Anthony, et al., A simple electrospray interface based on a DC ion carpet, Int. J. Mass Spectrom. 371, 1-7 (2014).
Bantel-Schaal, U., et al., "Human Adena-Associated Virus Type 5 Is Only Distantly Related to Other Known Primate Helper-Dependent Parvoviruses", Journal of Virology, vol. 73, pp. 939-947 (Feb. 1999).
Beuhler, et al., Threshold studies of secondary electron emission induced by macro ion impact on solid surfaces. Nucl. Instrum. Methods. 170, 309-315 (1980).
Beuhler, et al., A study of the formation of high molecular weight water cluster ions (m/e < 59000) in expansion of onized gas mixtures, J. Chem. Phys. 77, 2549-2557 (1982).
Botamanenko, Daniel, et al., "Ion-Ion Interactions in Charge Detection Mass Spectrometry", J Am Soc Mass Spectrom. Dec. 2019 ; 30(12): 2741-2749. doi:10.1007/s13361-019-02343-y.
Brancia, et al., Digital asymmetric waveform isolation (DAWI) in a digital linear ion trap. J_ Am. Soc_ Mass Spectrom. 1. 1530-1533 (2010).
Brown, C., et al. "Chimeric Parvovirus B19 Capsids for the Presentation of Foreign Epitope",; Virology 198, pp. 477-488 (1994).
Brown, Brooke Ann, et al., "Charge Detection Mass Spectrometry Measurements of Exosomes and other Extracellular Particles Enriched from Bovine Milk" Anal. Chem., Just Accepted Manuscript • DOI: 10.1021/acs.analchem.9b05173 • Publication Date (Web): Jan. 28, 2020 Downloaded from pubs.acs.org on Jan. 30, 2020.
Burnham, et al. "Analytical Ultracentrifugation as an Approach to Characterize Recombinant Adena-Associated Viral Vectors", Human Gene Therapy Methods, vol. 26, No. 6; pp. 228-242, Oct. 15, 2015.
Chao, Hengiun, et al. "Several Log Increase in Therapeutic Transgene Delivery by Distinct Adena-Associated Viral Serotype Vectors" Molecular Therapy vol. 2, No. 6, pp. 619-623 (Dec. 2000).
Japanese Office Action dated Feb. 17, 2023 for application 2020-568389—11 pages.
European Office Action dated Mar. 3, 2023 for application 19732193.8—14 pages.
Japanese Office Action dated Jan. 6, 2023 for application 2020-568366—9 pages (References 1 and 2 and the Doussineau article cited in this document have been previously submitted).
Japanese Office Action dated Jan. 18, 2023 for 2020-568469—16 pages (References 1, 2, 3 and 5 , and prior art document JP 2010-515210 English equivalent US 2013/327934A1, cited in this document have been previously submitted).
Japanese Office Action dated Jan. 18, 2023 for application 2020-568379—11 pages (Prior art documents David Keifer, U.S. Pat. No. 5,880,466, U.S. Pat. No. 6,888,130 and U.S. Publication 2011/0240845 have been previously submitted).

* cited by examiner

INSTRUMENT, INCLUDING AN ELECTROSTATIC LINEAR ION TRAP WITH CHARGE DETECTOR RESET OR CALIBRATION, FOR SEPARATING IONS

CROSS-REFERENCE TO RELATED APPLICATIONS

This is a continuation of U.S. patent application Ser. No. 17/468,841, filed Sep. 8, 2021, which is a divisional application of U.S. patent application Ser. No. 17/058,553, filed Nov. 4, 2020 and now U.S. Pat. No. 11,177,122, which is a U.S. national stage entry of PCT Application No. PCT/US2019/035381, filed Jun. 4, 2019, which claims the benefit of and priority to U.S. Provisional Patent Application Ser. No. 62/680,272, filed Jun. 4, 2018, and is a continuation-in-part of International Patent Application No. PCT/US2019/013284, filed Jan. 11, 2019, the disclosures of which are all-incorporated herein by reference in their entireties.

GOVERNMENT RIGHTS

This invention was made with government support under CHE1531823 awarded by the National Science Foundation. The United States Government has certain rights in the invention.

TECHNICAL FIELD

The present disclosure relates generally to charge detection instruments, and more specifically to apparatuses and methods for calibrating such instruments.

BACKGROUND

Mass Spectrometry provides for the identification of chemical components of a substance by separating gaseous ions of the substance according to ion mass and charge. Various instruments and techniques have been developed for determining the masses of such separated ions, and one such technique is known as charge detection mass spectrometry (CDMS). In CDMS, ion mass is determined as a function of measured ion mass-to-charge ratio, typically referred to as "m/z," and measured ion charge.

High levels of uncertainty in m/z and charge measurements with early CDMS detectors has led to the development of an electrostatic linear ion trap (ELIT) detector in which ions are made to oscillate back and forth through a charge detection cylinder. Multiple passes of ions through such a charge detection cylinder provides for multiple measurements for each ion, and it has been shown that the uncertainty in charge measurements decreases with $n^{1/2}$, where n is the number of charge measurements. However, spurious, extraneous and/or other charges picked up on the charge detector can present challenges to distinguishing valid and detectable charges from charge detector noise, and this effect becomes even more pronounced as charge signal levels approach the noise floor of the charge detector. Accordingly, it is desirable to seek improvements in ELIT design and/or operation which extend the range of valid, detectable charge measurements over those obtainable using current ELIT designs.

SUMMARY

The present disclosure may comprise one or more of the features recited in the attached claims, and/or one or more of the following features and combinations thereof. In a first aspect, a charge detection mass spectrometer (CDMS) may comprise an ion source configured to generate ions from a sample, a mass spectrometer configured to separate the generated ions as a function of ion mass-to-charge ratio, an electrostatic linear ion trap (ELIT) having a charge detection cylinder disposed between first and second ion mirrors, wherein ions exiting the mass spectrometer are supplied to the ELIT, a charge generator for generating free charges, a field free region between the charge generator and the charge detection cylinder, and a processor configured to control operation of the first and second ion mirrors to trap at least one ion from the source of ions therein, and to thereafter cause the trapped at least one ion to oscillate back and forth between the first and second ion mirrors each time passing through the charge detection cylinder and inducing at least one corresponding charge thereon, and wherein the processor is configured to control the charge generator, with no ions in the charge detection cylinder, to generate a target number of free charges and cause the target number of free charges to travel across the field-free region and into contact with the charge detection cylinder to deposit the target number of free charges thereon and thereby calibrate or reset the charge detection cylinder to a corresponding target charge level.

In a second aspect, an instrument for separating ions may comprise an ion source configured to generate ions from a sample, a first mass spectrometer configured to separate the generated ions as a function of mass-to-charge ratio, an ion dissociation stage positioned to receive ions exiting the first mass spectrometer and configured to dissociate ions exiting the first mass spectrometer, a second mass spectrometer configured to separate dissociated ions exiting the ion dissociation stage as a function of mass-to-charge ratio, and a charge detection mass spectrometer (CDMS) coupled in parallel with and to the ion dissociation stage such that the CDMS can receive ions exiting either of the first mass spectrometer and the ion dissociation stage, the CDMS comprising (i) at least one ion separation instrument configured to separate ions as a function of at least one molecular characteristic, (ii) an electrostatic linear ion trap (ELIT) having a charge detection cylinder disposed between first and second ion mirrors, wherein ions exiting the at least one ion separation instrument are supplied to the ELIT, (iii) a charge generator for generating free charges, (iv) a field free region between the charge generator and the charge detection cylinder, and (v) a processor configured to control the charge generator to generate a target number of free charges and cause the target number of free charges to travel across the field-free region and into contact with the charge detection cylinder to deposit the target number of free charges thereon and thereby calibrate or reset the charge detection cylinder to a corresponding target charge level, wherein masses of precursor ions exiting the first mass spectrometer are measured using the CDMS, mass-to-charge ratios of dissociated ions of precursor ions having mass values below a threshold mass are measured using the second mass spectrometer, and mass-to-charge ratios and charge values of dissociated ions of precursor ions having mass values at or above the threshold mass are measured using the CDMS.

In a third aspect, a method is provided for resetting or calibrating a charge detector of a charge detection mass spectrometer (CDMS), the charge detector including an electrostatic linear ion trap (ELIT) having a charge detection cylinder disposed between first and second ion mirrors. The method may comprise controlling, with a processor, a charge generator to generate a target number of free charges, and accelerating the generated target number of free charges across a field-free region defined between the charge generator and the charge detection cylinder and into contact with the charge detection cylinder to deposit the target number of free charges thereon and thereby calibrate or reset the charge detection cylinder to a corresponding target charge level.

DESCRIPTION OF THE ILLUSTRATIVE EMBODIMENTS

For the purposes of promoting an understanding of the principles of this disclosure, reference will now be made to a number of illustrative embodiments shown in the attached drawings and specific language will be used to describe the same.

This disclosure relates to an electrostatic linear ion trap (ELIT) including an apparatus for calibrating or resetting the charge detector thereof, and to means and methods for controlling both. In one embodiment, an example of which will be described in detail below with respect to FIGS. 3A-3E, the calibration apparatus is controlled in a manner which calibrates or resets the charge detector of the ELIT to a predefined reference charge level between ion measurement events. In another embodiment, an example of which will be described in detail below with respect to FIGS. 5A-5F, the calibration apparatus is controlled in a manner which calibrates or resets the charge detector of the ELIT to a predetermined reference charge level between charge detection events. For purposes of this disclosure, the phrase "charge detection event" is defined as detection of a charge associated with an ion passing a single time through the charge detector of the ELIT, and the phrase "ion measurement event" is defined as a collection of charge detection events resulting from oscillation of an ion back and forth through the charge detector a selected number of times or for a selected time period.

Figure 1:
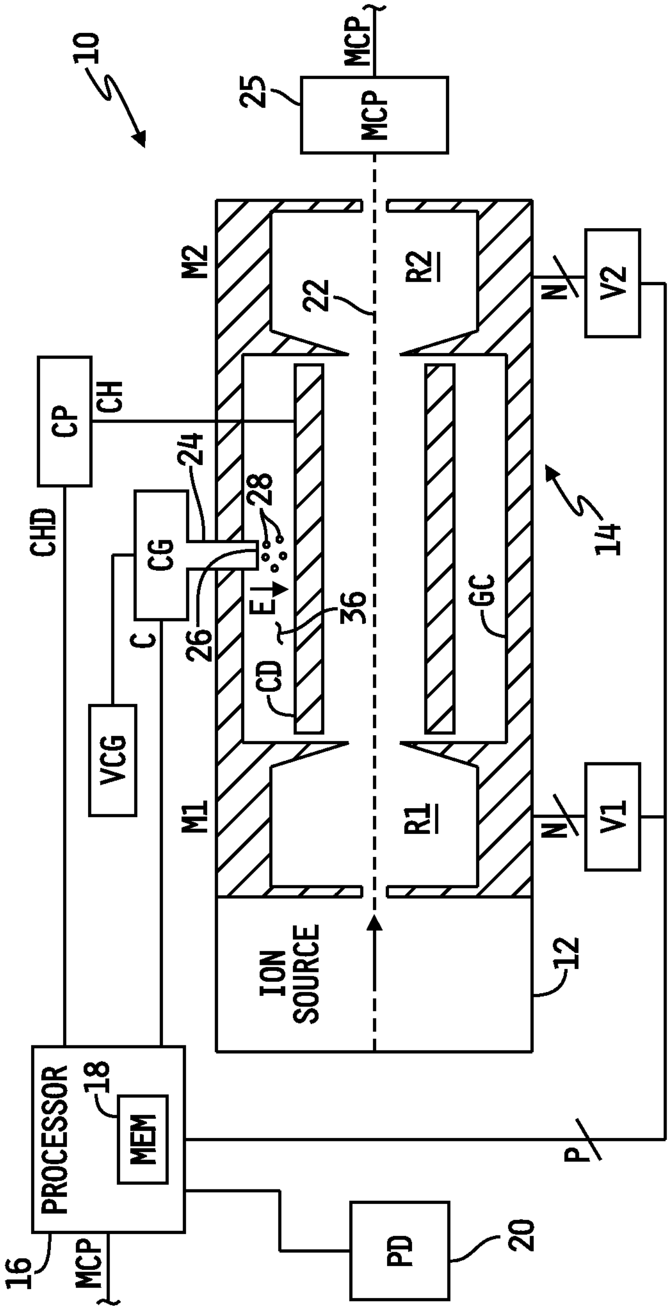
FIG. 1 is a simplified diagram of an ion mass detection system including an embodiment of an electrostatic linear ion trap (ELIT) with control and measurement components coupled thereto and including an apparatus for calibrating or resetting the charge detector thereof.

Referring to FIG. 1, a charge detection mass spectrometer (CDMS) 10 is shown including an embodiment of an electrostatic linear ion trap (ELIT) 14 with control and measurement components coupled thereto and including an apparatus for calibrating or resetting the charge detector of the ELIT 14. In the illustrated embodiment, the CDMS 10 includes an ion source 12 operatively coupled to an inlet of the ELIT 14. As will be described further with respect to FIG. 6A, the ion source 12 illustratively includes any conventional device or apparatus for generating ions from a sample and may further include one or more devices and/or instruments for separating, collecting, filtering, fragmenting and/or normalizing ions according to one or more molecular characteristics. As one illustrative example, which should not be considered to be limiting in any way, the ion source 12 may include a conventional electrospray ionization source, a matrix-assisted laser desorption ionization (MALDI) source or the like, coupled to an inlet of a conventional mass spectrometer. The mass spectrometer may be of any conventional design including, for example, but not limited to a time-of-flight (TOF) mass spectrometer, a reflectron mass spectrometer, a Fourier transform ion cyclotron resonance (FTICR) mass spectrometer, a quadrupole mass spectrometer, a triple quadrupole mass spectrometer, a magnetic sector mass spectrometer, or the like. In any case, the ion outlet of the mass spectrometer is operatively coupled to an ion inlet of the ELIT 14. The sample from which the ions are generated may be any biological or other material.

In the illustrated embodiment, the ELIT 14 illustratively includes a charge detector CD surrounded by a ground chamber or cylinder GC and operatively coupled to opposing ion mirrors M1, M2 respectively positioned at opposite ends thereof. The ion mirror M1 is operatively positioned between the ion source 12 and one end of the charge detector CD, and ion mirror M2 is operatively positioned at the opposite end of the charge detector CD. Each ion mirror M1, M2 defines a respective ion mirror region R1, R2 therein. The regions R1, R2 of the ion mirrors M1, M2, the charge detector CD, and the spaces between the charge detector CD and the ion mirrors M1, M2 together define a longitudinal axis 22 centrally therethrough which illustratively represents an ideal ion travel path through the ELIT 14 and between the ion mirrors M1, M2 as will be described in greater detail below.

In the illustrated embodiment, voltage sources V1, V2 are electrically connected to the ion mirrors M1, M2 respectively. Each voltage source V1, V2 illustratively includes one or more switchable DC voltage sources which may be controlled or programmed to selectively produce a number, N, programmable or controllable voltages, wherein N may be any positive integer. Illustrative examples of such voltages will be described below with respect to FIGS. 2A and 2B to establish one of two different operating modes of each of the ion mirrors M1, M2 as will be described in detail below. In any case, ions move within the ELIT 14 along the longitudinal axis 22 extending centrally through the charge detector CD and the ion mirrors M1, M2 under the influence of electric fields selectively established by the voltage sources V1, V2.

The voltage sources V1, V2 are illustratively shown electrically connected by a number, P, of signal paths to a conventional processor 16 including a memory 18 having instructions stored therein which, when executed by the processor 16, cause the processor 16 to control the voltage sources V1, V2 to produce desired DC output voltages for selectively establishing ion transmission and ion reflection electric fields, TEF, REF respectively, within the regions R1, R2 of the respective ion mirrors M1, M2. P may be any positive integer. In some alternate embodiments, either or both of the voltage sources V1, V2 may be programmable to selectively produce one or more constant output voltages. In other alternative embodiments, either or both of the voltage sources V1, V2 may be configured to produce one or more time-varying output voltages of any desired shape. It will be understood that more or fewer voltage sources may be electrically connected to the mirrors M1, M2 in alternate embodiments.

The charge detector CD is illustratively provided in the form of an electrically conductive cylinder which is electrically connected to a signal input of a charge sensitive preamplifier (or charge sensitive amplifier) CP, and the signal output of the charge preamplifier CP is electrically connected to the processor 16. The charge preamplifier CP is illustratively operable in a conventional manner to receive a charge signal (CH) corresponding to a charge induced on the charge detection cylinder CD by an ion passing therethrough, to produce a charge detection signal (CHD) corresponding thereto and to supply the charge detection signal CHD to the processor 16. In some embodiments, the charge preamplifier CP may include conventional feedback components, e.g., one or more resistors and/or other conventional feedback circuitry, coupled between the output and at least one of the inputs thereof. In some alternate embodiments, the charge preamplifier CP may not include any resistive feedback components, and in still other alternate embodiments the charge preamplifier CP may not include any feedback components at all. In any case, the processor 16 is, in turn, illustratively operable to receive and digitize charge detection signals CHD produced by the charge preamplifier CP, and to store the digitized charge detection signals CHD in the memory 18. The processor 16 is further illustratively coupled to one or more peripheral devices 20 (PD) for providing signal input(s) to the processor 16 and/or to which the processor 16 provides signal output(s). In some embodiments, the peripheral devices 20 include at least one of a conventional display monitor, a printer and/or other output device, and in such embodiments the memory 18 has instructions stored therein which, when executed by the processor 16, cause the processor 16 to control one or more such output peripheral devices 20 to display and/or record analyses of the stored, digitized charge detection signals.

The voltage sources V1, V2 are illustratively controlled in a manner, as described in detail below, which selectively traps an ion entering the ELIT 14 and causes the trapped ion to oscillate back and forth between the ion mirrors M1, M2 such that it repeatedly passes through the charge detection cylinder CD. A plurality of charge and oscillation period values are measured at the charge detection cylinder CD, and the recorded results are processed to determine mass-to-charge ratio, charge and mass values of the ion trapped in the ELIT 14.

Figure 2A:
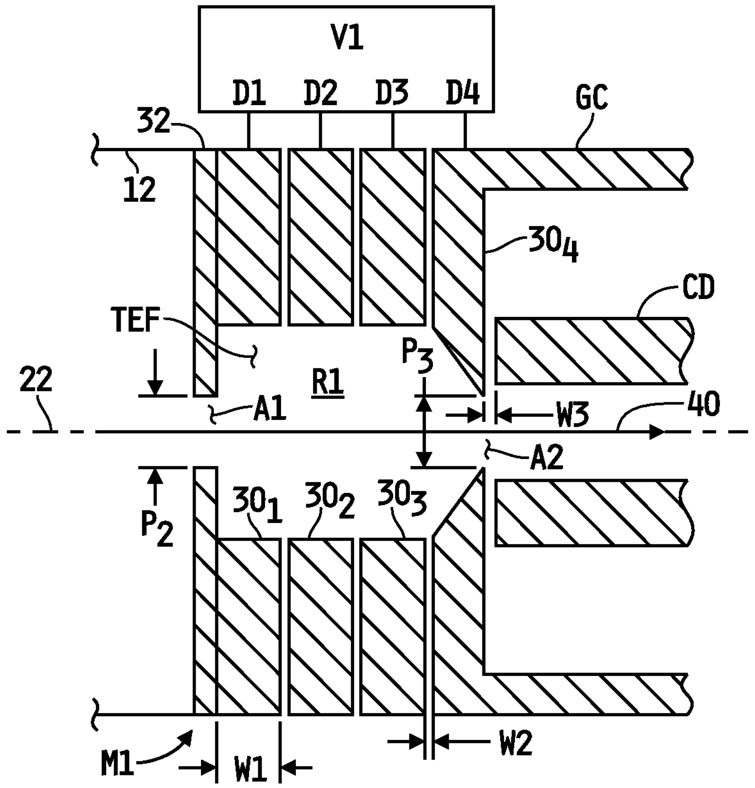
FIG. 2A is a magnified view of the ion mirror M1 of the ELIT illustrated in FIG. 1 in which the mirror electrodes of M1 are controlled to produce an ion transmission electric field therein.
Figure 2B:
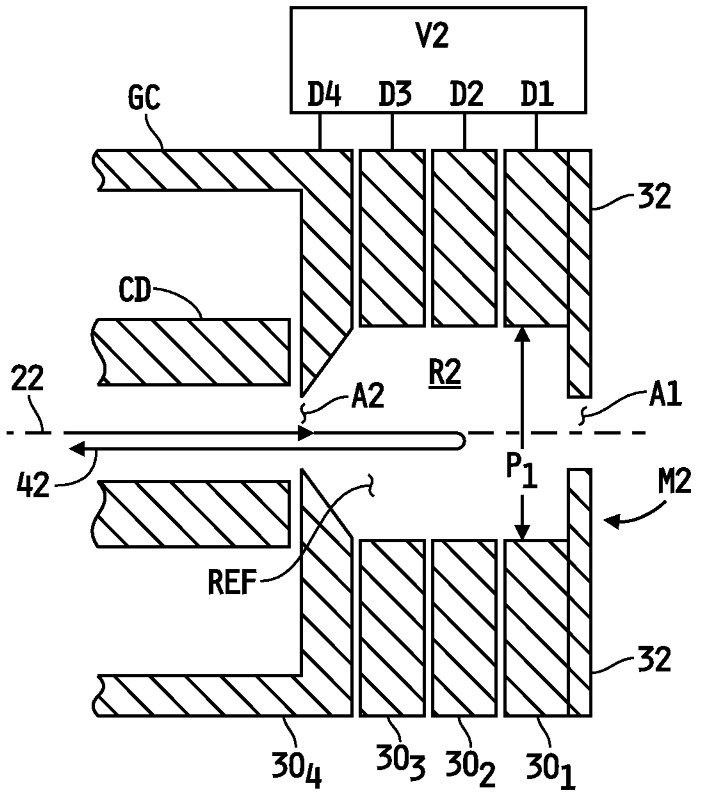
FIG. 2B is a magnified view of the ion mirror M2 of the ELIT illustrated in FIG. 1 in which the mirror electrodes of M2 are controlled to produce an ion reflection electric field therein.

Referring now to FIGS. 2A and 2B, embodiments are shown of the ion mirrors M1, M2 respectively of the ELIT 14 depicted in FIG. 1. Illustratively, the ion mirrors M1, M2 are identical to one another in that each includes a cascaded arrangement of 4 spaced-apart, electrically conductive mirror electrodes. For each of the ion mirrors M1, M2, a first mirror electrode $\mathbf{30}_1$ has a thickness W1 and defines a passageway centrally therethrough of diameter P1. An endcap 32 is affixed or otherwise coupled to an outer surface of the first mirror electrode $\mathbf{30}_1$ and defines an aperture A1 centrally therethrough which serves as an ion entrance and/or exit to and/or from the corresponding ion mirror M1, M2 respectively. In the case of the ion mirror M1, the endcap 32 is coupled to, or is part of, an ion exit of the ion source 12 illustrated in FIG. 1. The aperture A1 for each endcap 32 illustratively has a diameter P2.

A second mirror electrode $\mathbf{30}_2$ of each ion mirror M1, M2 is spaced apart from the first mirror electrode $\mathbf{30}_1$ by a space having width W2. The second mirror electrode $\mathbf{30}_2$, like the mirror electrode $\mathbf{30}_1$, has thickness W1 and defines a passageway centrally therethrough of diameter P2. A third mirror electrode $\mathbf{30}_3$ of each ion mirror M1, M2 is likewise spaced apart from the second mirror electrode $\mathbf{30}_2$ by a space of width W2. The third mirror electrode $\mathbf{30}_2$ has thickness W1 and defines a passageway centrally therethrough of width P1.

A fourth mirror electrode $\mathbf{30}_4$ is spaced apart from the third mirror electrode $\mathbf{30}_3$ by a space of width W2. The fourth mirror electrode $\mathbf{30}_4$ illustratively has a thickness of W1 and is formed by a respective end of the ground cylinder, GC disposed about the charge detector CD. The fourth mirror electrode $\mathbf{30}_4$ defines an aperture A2 centrally therethrough which is illustratively conical in shape and increases linearly between the internal and external faces of the ground cylinder GC from a diameter P3 defined at the internal face of the ground cylinder GC to the diameter P1 at the external face of the ground cylinder GC (which is also the internal face of the respective ion mirror M1, M2).

The spaces defined between the mirror electrodes $\mathbf{30}_1$-$\mathbf{30}_4$ may be voids in some embodiments, i.e., vacuum gaps, and in other embodiments such spaces may be filled with one or more electrically non-conductive, e.g., dielectric, materials. The mirror electrodes $30_1$-$30_4$ and the endcaps 32 are axially aligned, i.e., collinear, such that a longitudinal axis 22 passes centrally through each aligned passageway and also centrally through the apertures A1, A2. In embodiments in which the spaces between the mirror electrodes $30_1$-$30_4$ include one or more electrically non-conductive materials, such materials will likewise define respective passageways therethrough which are axially aligned, i.e., collinear, with the passageways defined through the mirror electrodes $30_1$-$30_4$ and which illustratively have diameters of P2 or greater. Illustratively, P1>P3>P2, although in other embodiments other relative diameter arrangements are possible.

A region R1 is defined between the apertures A1, A2 of the ion mirror M1, and another region R2 is likewise defined between the apertures A1, A2 of the ion mirror M2. The regions R1, R2 are illustratively identical to one another in shape and in volume.

As described above, the charge detector CD is illustratively provided in the form of an elongated, electrically conductive cylinder positioned and spaced apart between corresponding ones of the ion mirrors M1, M2 by a space of width W3. In on embodiment, W1>W3>W2, and P1>P3>P2, although in alternate embodiments other relative width arrangements are possible. In any case, the longitudinal axis 22 illustratively extends centrally through the passageway defined through the charge detection cylinder CD, such that the longitudinal axis 22 extends centrally through the combination of the passageways defined by the regions R1, R2 of the ion mirrors M1, M2 and the passageway defined through the charge detection cylinder CD. In operation, the ground cylinder GC is illustratively controlled to ground potential such that the fourth mirror electrode $30_4$ of each ion mirror M1, M2 is at ground potential at all times. In some alternate embodiments, the fourth mirror electrode $30_4$ of either or both of the ion mirrors M1, M2 may be set to any desired DC reference potential, or to a switchable DC or other time-varying voltage source.

In the embodiment illustrated in FIGS. 2A and 2B, the voltage sources V1, V2 are each configured to each produce four DC voltages D1-D4, and to supply the voltages D1-D4 to a respective one of the mirror electrodes $30_1$-$30_4$ of the respective ion mirror M1, M2. In some embodiments in which one or more of the mirror electrodes $30_1$-$30_4$ is to be held at ground potential at all times, the one or more such mirror electrodes $30_1$-$30_4$ may alternatively be electrically connected to the ground reference of the respective voltage supply V1, V2 and the corresponding one or more voltage outputs D1-D4 may be omitted. Alternatively or additionally, in embodiments in which any two or more of the mirror electrodes $30_1$-$30_4$ are to be controlled to the same non-zero DC values, any such two or more mirror electrodes $30_1$-$30_4$ may be electrically connected to a single one of the voltage outputs D1-D4 and superfluous ones of the output voltages D1-D4 may be omitted.

Each ion mirror M1, M2 is illustratively controllable and switchable, by selective application of the voltages D1-D4, between an ion transmission mode (FIG. 2A) in which the voltages D1-D4 produced by the respective voltage source V1, V2 establishes an ion transmission electric field (TEF) in the respective region R1, R2 thereof, and an ion reflection mode (FIG. 2B) in which the voltages D1-D4 produced by the respect voltage source V1, V2 establishes an ion reflection electric field (REF) in the respective region R1, R2 thereof. As illustrated by example in FIG. 2A, once an ion from the ion source 12 flies into the region R1 of the ion mirror M1 through the inlet aperture A1 of the ion mirror M1, the ion is focused toward the longitudinal axis 22 of the ELIT 14 by an ion transmission electric field TEF established in the region R1 of the ion mirror M1 via selective control of the voltages D1-D4 of V1. As a result of the focusing effect of the transmission electric field TEF in the region R1 of the ion mirror M1, the ion exiting the region R1 of the ion mirror M1 through the aperture A2 of the ground chamber GC attains a narrow trajectory into and through the charge detector CD, i.e., so as to maintain a path of ion travel through the charge detector CD that is close to the longitudinal axis 22. An identical ion transmission electric field TEF may be selectively established within the region R2 of the ion mirror M2 via like control of the voltages D1-D4 of the voltage source V2. In the ion transmission mode, an ion entering the region R2 from the charge detection cylinder CD via the aperture A2 of M2 is focused toward the longitudinal axis 22 by the ion transmission electric field TEF within the region R2 so that the ion exits the ion mirror M2 through the aperture A1 thereof.

As illustrated by example in FIG. 2B, an ion reflection electric field REF established in the region R2 of the ion mirror M2 via selective control of the voltages D1-D4 of V2 acts to decelerate and stop an ion entering the ion region R2 from the charge detection cylinder CD via the ion inlet aperture A2 of M2, to accelerate the ion in the opposite direction back through the aperture A2 of M2 and into the end of the charge detection cylinder CD adjacent to M2 as depicted by the ion trajectory 42, and to focus the ion toward the central, longitudinal axis 22 within the region R2 of the ion mirror M2 so as to maintain a narrow trajectory of the ion back through the charge detector CD toward the ion mirror M1. An identical ion reflection electric field REF may be selectively established within the region R1 of the ion mirror M1 via like control of the voltages D1-D4 of the voltage source V1. In the ion reflection mode, an ion entering the region R1 from the charge detection cylinder CD via the aperture A2 of M1 is decelerated and stopped by the ion reflection electric field REF established within the region R1, then accelerated in the opposite direction back through the aperture A2 of M1 and into the end of the charge detection cylinder CD adjacent to M1, and focused toward the central, longitudinal axis 22 within the region R1 of the ion mirror M1 so as to maintain a narrow trajectory of the ion back through the charge detector CD and toward the ion mirror M2. An ion that traverses the length of the ELIT 14 and is reflected by the ion reflection electric field REF in the ion regions R1, R2 in a manner that enables the ion to continue traveling back and forth through the charge detection cylinder CD between the ion mirrors M1, M2 as just described is considered to be trapped within the ELIT 14.

Example sets of output voltages D1-D4 produced by the voltage sources V1, V2 respectively to control a respective one of the ion mirrors M1, M2 to the ion transmission and reflection modes described above are shown in TABLE I below. It will be understood that the following values of D1-D4 are provided only by way of example, and that other values of one or more of D1-D4 may alternatively be used.

TABLE I

| Ion Mirror Operating Mode | Output Voltages (volts DC) |
|---|---|
| Transmission | V1: D1 = 0, D2 = 95, D3 = 135, D4 = 0 |
| | V2: D1 = 0, D2 = 95, D3 = 135, D4 = 0 |
| Reflection | V1: D1 = 190, D2 = 125, D3 = 135, D4 = 0 |
| | V2: D1 = 190, D2 = 125, D3 = 135, D4 = 0 |

While the ion mirrors M1, M2 and the charge detection cylinder CD are illustrated in FIGS. 1-2B as defining cylindrical passageways therethrough, it will be understood that in alternate embodiments either or both of the ion mirrors M1, M2 and/or the charge detection cylinder CD may define non-cylindrical passageways therethrough such that one or more of the passageway(s) through which the longitudinal axis 22 centrally passes represents a cross-sectional area and profile that is not circular. In still other embodiments, regardless of the shape of the cross-sectional profiles, the cross-sectional areas of the passageway defined through the ion mirror M1 may be different from the passageway defined through the ion mirror M2.

The voltage sources V1, V2 are illustratively controlled in a manner which selectively establishes ion transmission and ion reflection electric fields in the region R1 of the ion mirror M1 and in the region R2 of the ion mirror M2 in a manner which allows ions to enter the ELIT 14 from the ion source 12, and which causes an ion to be selectively trapped within the ELIT 14 such that the trapped ion repeatedly passes through the charge detector CD as it oscillates within the ELIT 14 between the ion mirrors M1 and M2. A charge induced on the charge detector CD each time an ion passes therethrough is detected by the charge preamplifier CP, and a corresponding charge detection signal (CHD) is produced by the charge preamplifier CP. The magnitude and timing of timing of the charge detection signal (CHD) produced by the charge preamplifier CP is recorded by the processor 16 for each charge detection event as this term is defined herein. Each charge detection event record illustratively includes an ion charge value, corresponding to a magnitude of the detected charge, and an oscillation period value, corresponding to the elapsed time between charge detection events, and each charge detection event record is stored by the processor 16 in the memory 18. The collection of charge detection events resulting from oscillation of an ion back and forth through the charge detector CD a selected number of times or for a selected time period, i.e., a making up an ion measurement event as this term is defined herein, are then processed to determine charge, mass-to-charge ratio and mass values of the ion.

In one embodiment, the ion measurement event data are processed by computing, with the processor 16, a Fourier Transform of the recorded collection of charge detection events. The processor 16 is illustratively operable to compute such a Fourier Transform using any conventional digital Fourier Transform (DFT) technique such as for example, but not limited to, a conventional Fast Fourier Transform (FFT) algorithm. In any case, the processor 16 is then illustratively operable to compute an ion mass-to-charge ratio value (m/z), an ion charge value (z) and ion mass values (m), each as a function of the computed Fourier Transform. The processor 16 is illustratively operable to store the computed results in the memory 18 and/or to control one or more of the peripheral devices 20 to display the results for observation and/or further analysis.

It is generally understood that the mass-to-charge ratio (m/z) of an ion oscillating back and forth through the charge detector CD of an ELIT between opposing ion mirrors M1, M2 thereof is inversely proportional to the square of the fundamental frequency ff of the oscillating ion according to the equation:

$$m/z=C/ff^2,$$

where C is a constant that is a function of the ion energy and also a function of the dimensions of the respective ELIT, and the fundamental frequency ff is determined directly from the computed Fourier Transform. The value of the ion charge, z, is proportional to the magnitude FTMAG of the fundamental frequency ff, taking into account the number of ion oscillation cycles. In some cases, the magnitude(s) of one or more of the harmonic frequencies of the FFT may be added to the magnitude of the fundamental frequency for purposes of determining the ion charge, z. In any case, ion mass, m, is then calculated as a product of m/z and z. The processor 16 is thus operable to compute $m/z=C/ff^2$, z=F (FTMAG) and m=(m/z)(z). Multiple, e.g., hundreds or thousands or more, ion trapping events are typically carried out for any particular sample from which the ions are generated by the ion source 12, and ion mass-to-charge, ion charge and ion mass values are determined/computed for each such ion trapping event. The ion mass-to-charge, ion charge and ion mass values for such multiple ion trapping events are, in turn, combined to form spectral information relating to the sample. Such spectral information may illustratively take different forms, examples of which include, but are not limited to, ion count vs. mass-to-charge ratio, ion charge vs. ion mass (e.g., in the form of an ion charge/mass scatter plot), ion count vs. ion mass, ion count vs. ion charge, or the like.

Referring again to FIG. 1, the illustrated ELIT 14 further includes a charge generator CG electrically connected to the processor 16 and electrically connected to a charge generator voltage source VCG. In the illustrated embodiment, the charge generator voltage source VCG is programmable or manually controllable to produce one or more DC voltages, voltage pulses and/or voltage waveforms of any magnitude, shape, duration and/or frequency. In alternate embodiments, the charge generator voltage source VCG may be operatively coupled to the processor 16 so that the processor 16 may control the charge generator voltage source VCG to produce one or more DC voltages, voltage pulses and/or voltage waveforms of any magnitude, shape, duration and/or frequency. In the illustrated embodiment at least one charge outlet passage 24 of the charge generator CG illustratively extends through the ground chamber GC such that a charge outlet 26 of the charge outlet passage 24 is in fluid communication with a space 36 defined between the inner surface of the ground chamber GC and the outer surface of the charge detection cylinder CD. In the illustrated embodiment, a single charge outlet passage 24 is shown extending through the ground chamber GC, although in alternate embodiments multiple charge outlet passages may extend through the ground chamber GC. In such embodiments, two or more charge outlet passages may be singly spaced apart, or spaced apart in groups of two or more, axially and/or radially along the charge detection cylinder CD.

In one embodiment, the charge generator CG is configured to be responsive to a control signal C produced by the processor 16 to generate free charges 28 which pass through the charge outlet 26 of the one or more charge outlet passages 24 into the space 36 defined between the inner surface of the ground chamber or cylinder GC and the outer surface of the electrically conductive charge detection cylinder CD. In the illustrated embodiment, the charges 28 produced by the charge generator are positive charges, although the charge generator CG may in alternate embodiments be configured to produce negative charges or to selectively produce positive or negative charges.

In one embodiment, the charge generator CG is configured, or controllable using conventional control circuitry and/or conventional control techniques, to be responsive to activation of the control signal C produced by the control circuit 16 to generate and supply to the space 36 within the ELIT 14 a predictable number of free charges 28, within any desired tolerance level, per unit of time. The unit of time may have any desired duration. In such embodiments, the total number of charges 28 supplied by the charge generator CG to the space 36 within the ELIT 14 in response to a single activation of the control signal C is thus controllable as a function of the number of charges 28 produced by the charge generator CG per unit time and a duration, i.e., pulse width, of the active portion of the control signal C. In alternate embodiments, the charge generator CG may be configured to produce a programmable number of charges 28 per unit time. In still other embodiments, the charge detector CG may be configured such that the number of charges 28 produced thereby in response to the control signal C is constant and predictable, or programmable, within any desired tolerance level, regardless and independently of the duration of the control signal C. In such embodiments, the number of charges 28 supplied by the charge generator CG to the space 36 within the ELIT 14 in response to any single activation of the control signal C is thus constant and predictable, and the total number of charges 28 that may be supplied by the charge generator CG to the space 36 within the ELIT 14 is controllable as a function of the total number of charges 28 produced with each single activation of the control signal C and the total number of activations of the control signal C produced by the processor 16.

The charge generator CG may be provided in the form of any conventional charge generator. As one example, the charge generator CG may be or include a conventional filament responsive to a voltage or current applied thereto to generate and produce the free charges 28. As another example, the charge generator CG may be or include an electrically conductive mesh or grid responsive to a voltage or current applied thereto to generate and produce the free charges 28. As yet another example, the charge generator CG may be or include a particle charge generator configured to produce the free charges in the form of charged particles from a sample source. Examples of such particle charge generators may include, but are not limited to, an electrospray ionization (ESI) source, a matrix-assisted Laser Desorption Ionization (MALDI) source, or the like. In any case, the charge generator CG is operable to generate and supply charges to the space 36 within the ELIT 14 via the charge outlet(s) of the one or more charge outlet passages extending into, and/or fluidly coupled to, the space 36.

With no charge induced on the charge detector CD by a charged particle passing therethrough or by one or more free charges 28 produced by the charge generator GC, the charge detection cylinder CD illustratively operates at or near a reference charge level $CH_{REF}$. As the charge detection cylinder CD is not powered or grounded, the reference charge level $CH_{REF}$ is typically tens of charges (i.e., elementary charges "e") or less, although in some applications the reference charge level $CH_{REF}$ may be more than tens of charges.

As described above, the charge generator CG is responsive to control signals C produced by the processor 16 or other control signal generating circuitry to generate charges 28 of desired polarity which then pass into the space 36 between the inner surface of the ground cylinder GC and the outer surface of the charge detection cylinder CD. As the ground cylinder GC is generally maintained at ground potential and the charge detection cylinder CD typically operates at or near ground potential, the space 36 is substantially a field-free region. In some embodiments, the one or more charge outlet passages 24 and/or the body of the charge generator CG illustratively include(s) one or more regions in which an electric field of suitable direction is established by the voltage source VCG (or by some other source(s)) for the purpose of accelerating the generated charges 28 into the field free region 36 so that the accelerated charges 28 then travel through the field free region 36 toward and into contact with the outer surface of the charge detection cylinder CD. When such charges 28 contact the outer surface of the charge detection cylinder CD, they impart their respective charges onto the charge detection cylinder CD. In this regard, the generation of charges 28 by the charge generator GC, and travel of the generated charges through the field free region 36 toward and into contact with the outer surface of the charge detection cylinder to thereby impart their charges onto the charge detection cylinder defines a "charge injection" process via which the generated charges 28 calibrate or reset the charge detection cylinder CD and/or the charge sensitive preamplifier CP in some embodiments thereof. Such injected charges may illustratively be removed from the charge detection cylinder CD by applying an equal amount of opposite charge, and may therefore illustratively be used to calibrate and/or reset the charge detection cylinder in some applications and/or to calibrate or reset the charge preamplifier in other applications.

The "charge injection" process just described is different from a "charge induction" process in which charge may be induced on the charge detection cylinder CD by establishing a voltage difference between the charge detection cylinder CD and a voltage reference, e.g., ground potential. One illustrative technique for inducing charge on the charge detection cylinder CD without physically coupling one or more wires and/or one or more electronic devices to the charge detection cylinder CD is to configure the charge generator GC such that the voltage source VCG establishes a potential of desired polarity on the at least one charge outlet passage 24. Establishing a DC potential on the at least one charge outlet passage 24 without generating charges 28 will generally create an electric field between the at least one charge outlet passage 24 and the charge detection cylinder CD, thus inducing a DC voltage and, in turn, a charge on the charge detection cylinder CD. The magnitude of the induced charge will generally be dependent upon the strength of the established electric field and thus upon the magnitude of the voltage applied by the voltage source VCG to the at least one charge outlet passage 24. Such induced charges may illustratively be removed or modified by applying a different voltage, e.g., ground or other potential, to the charge detection cylinder CD, and may therefore be used to compensate for switching voltages applied to the ion mirror(s) M1 and/or M2, and for calibrating the charge preamplifier CP in some embodiments thereof. In alternate embodiments of the charge generator CG described above in which the charge generator CG is operable to generate free charges, the charge generator CG may thus be configured to operate as a charge induction antenna. In such embodiments, the voltage source VCG is controlled, illustratively by the processor 16, to produce a DC voltage, a voltage pulse or a series of voltage pulses, or a voltage waveform which is/are applied to the charge outlet passage(s) 24 to create or establish one or more corresponding electric fields between the charge outlet passage(s) 24 generally (and in some embodiments the charge outlet(s) 26 specifically) and the charge detection cylinder CD to thereby induce a corresponding charge or charges on the charge detection cylinder. In such embodiments, the charge outlet passage(s) 24 may, but need not, include one or more charge outlets 26 in fluid communication with the space 36. In some embodiments, for example, in which the charge generator CG is configured strictly for charge induction, the charge outlet passage(s) 24 may be or include one or more electrically conductive rods, probes, filaments or the like which does/do not include any outlets for dispensing or otherwise producing free charges. In other embodiments in which the charge generator CG is configured to operate as a charge induction device and a charge injection device, the charge outlet passage(s) 24 will illustratively include one or more charge outlets 24 as described above for dispensing or otherwise producing free charges 28.

Thus, in some embodiments, the charge generator CG is illustratively configured to operate strictly as a charge injection device in which the charge generator CG is responsive to control signals C to generate charges 28 of suitable polarity and to accelerate the generated charges 28 out of the at least one charge outlet 26 of the at least one charge outlet passage 24 and into the field free region 36 such that the generated charges 28 travel through the field free region 36 toward and into contact with the external surface of the charge detection cylinder CD to impart their charges on the charge detection cylinder CD. In alternate embodiments, the charge generator CG may illustratively be configured to operate strictly as a charge induction device in which the charge generator CG is responsive to control signals C to apply at least one voltage of suitable magnitude and polarity to establish a corresponding electric field within the region 36 between the at least one charge outlet passage 24 and the charge detection cylinder CD to induce a DC voltage, and thus a charge, on the charge detection cylinder CD. In other alternate embodiments, the charge generator CD may illustratively be configured to operate both (e.g., simultaneously or separately) as a charge injection device and as a charge induction device in which the charge generator CG is responsive to control signals C produced by the processor 16 to generate charges 28 of suitable polarity and/or to apply one or more voltages of suitable magnitude and polarity to establish an electric field within the region 36 between the at least one charge outlet passage 24 and the charge detection cylinder CD to (i) induce a DC voltage, and thus a charge, on the charge detection cylinder CD, and (ii) to also accelerate the generated charges 28, under the influence of the established electric field within the region 36, toward and into contact with the external surface of the charge detection cylinder CD to impart their charges on the charge detection cylinder CD. The charge generator CG may thus be configured and operable strictly as a charge injector, strictly as a charge inducer or as a combination charge injector and charge inducer.

In embodiments in which the charge generator CG is configured and operable as a charge injector to produce a controlled number of charges 28 which then travel to, or are transported to, and in contact with the outer surface of the charge detection cylinder CD, such charges illustratively impart a target charge level, $CH_T$, on the charge detection cylinder CD. In one embodiment, the number and polarity of the generated charges 28 may be selected to impart a target charge level $CH_T$ that is greater than $CH_{REF}$, e.g., to achieve a constant target charge level $CH_T$ which is above $CH_{REF}$ and any noise induced thereon, and in other embodiments the number and polarity of the generated charges 28 may be selected to impart a target charge level $CH_T$ that is less than $CH_{REF}$, e.g., to achieve a target charge level $CH_T$ at or near a zero charge level. In embodiments in which the charge generator CG is configured and operable as a charge inducer to controllably establish an electric field which induces a DC voltage or potential on the charge detection cylinder CD, such DC voltage or potential illustratively induces the target charge level $CH_T$ of suitable magnitude and polarity on the charge detection cylinder CD. In embodiments in which the charge generator CG is configured and operable as a combination charge injector and charge inducer, the net charge induced and imparted on the charge detection cylinder is the target charge $CH_T$ of suitable magnitude and polarity.

Figure 3A:
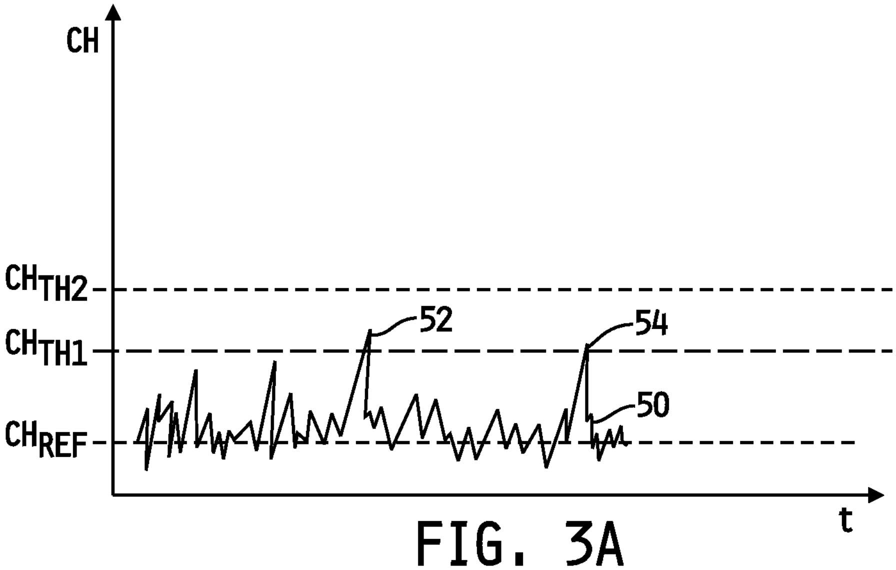
FIG. 3A is a plot of charge detection cylinder charge vs. time illustrating two different charge detection threshold levels in comparison to a noisy charge reference on the charge detection cylinder.

The reference charge level $CH_{REF}$ on the charge detection cylinder CD is subject to one or more potentially significant sources of charge noise which may introduce uncertainty in charge detection events as a result of uncertainty in the reference charge level at any point in time. Referring to FIG. 3A, for example, a plot is shown of charge CH on the charge detection cylinder CD vs. time in which no charge detection events are present but in which an example charge noise waveform 50 is shown superimposed on the reference charge level $CH_{REF}$. In embodiments in which the charge sensitive preamplifier CP does not include feedback components, one such source of such charge noise 50 is an accumulation of charges on the charge detection cylinder CD and thus at the input of the charge sensitive preamplifier CP during normal operation thereof. In this and other embodiments, capacitance of the charge detector CD also contributes, as does spurious noise caused by external events and extraneous charges induced on the charge detection cylinder resulting from switching of either or both of the ion mirrors M1, M2 between ion transmission and ion reflection modes of operation.

Such charge noise 50, from any source, is undesirable as it can produce false charge detection events and/or can require setting a charge detection threshold higher than desired. As an example of the former case, the plot of FIG. 3A further illustrates an example charge detection threshold $CH_{TH1}$ implemented in the ion mass detection system 10 for the purpose of distinguishing valid charge detection events from the reference charge level $CH_{REF}$. In the illustrated example, two peaks 52, 54 of the charge noise 50 present at and around $CH_{REF}$ exceed $CH_{TH1}$ and will thus be incorrectly or falsely detected as valid charge detection events, thereby corrupting the ion measurement event data for the ion(s) being evaluated. As an example of the latter case, a second example charge detection threshold $CH_{TH2}$ is also illustrated in FIG. 3A which is illustratively positioned safely above the highest peak of the charge noise 50 so as to avoid false charge detection events of the type just described. However, the higher charge detection threshold $CH_{TH2}$ leaves an undesirably large range of undetectable charge values between $CH_{TH2}$ and $CH_{REF}$ which would otherwise be detectable but for the high level of charge noise 50.

In the embodiment of the ELIT 14 illustrated in FIG. 1, the charge generator CG is illustratively implemented and controlled to selectively generate a target number of charges 28 which are transported through the field free region 36 to, and into contact with, the outer surface of the charge detection cylinder CD, e.g., under the influence of one or more suitably directed electric fields at or within the charge generator CG as described above. The charges 28 deposited on the charge detection cylinder CD illustratively combine with any charge noise carried on the charge detection cylinder CD to produce a substantially constant, predictable and repeatable target charge level, $CH_T$, on the charge detection cylinder CD. In one example embodiment, the target number and polarity of the generated charges 28 may be selected to impart a target charge level $CH_T$ on the charge detection cylinder which is greater in magnitude than the combination of the reference charge level $CH_{REF}$ and any charge noise present on the charge detection cylinder CD. The target charge level $CH_T$ in this example embodiment thus envelopes and overrides the combination of $CH_{REF}$ and any charge noise, leaving a new and substantially constant charge reference in the form of $CH_T$. Alternatively or additionally, the charge generator CG may be controlled to induce a suitable charge on the charge detection cylinder CD by controlling the voltage source VCG to apply one or more corresponding voltages to the charge generator CG.

In alternate embodiments, the target number and polarity of the generated charges 28 may be selected to neutralize at least one or the combination of the reference charge level $CH_{REF}$ and any charge noise present on the charge detection cylinder CD so as to induce a resulting target charge level $CH_T$ on the charge detection cylinder CD which is less than $CH_{REF}$, e.g., to achieve a target charge level $CH_T$ or near a zero charge level. Such a result may illustratively be accomplished by controlling the charge generator CG to first inject positive charges and to then inject negative charges, or to alternatively induce a suitable charge on the charge detection cylinder CD by controlling the voltage source VCG to apply one or more corresponding voltages to the charge generator CG. In some embodiments in which an amount of charge noise 50 at the input charge sensitive preamplifier CP is specifically targeted (e.g., in embodiments in which the charge sensitive preamplifier does not include any feedback components as described above), the target charge level $CH_T$ may be a charge magnitude and/or polarity which, when deposited or imparted on the charge detection cylinder CD, acts to clear such charge noise 50 therefrom and thus from the input of the charge preamplifier so as to reset the charge sensitive preamplifier CP to predictable operating conditions.

Figure 3B:
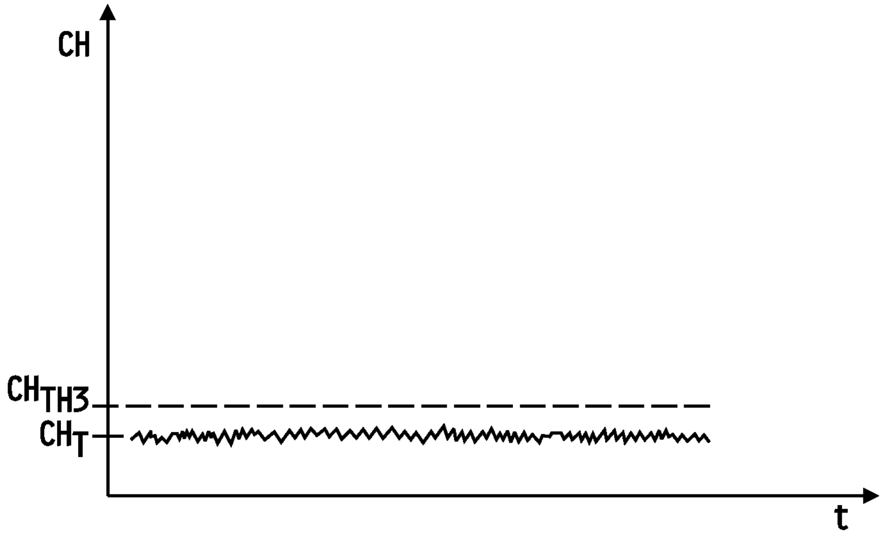
FIG. 3B is a plot of charge detection cylinder charge vs. time illustrating a lower charge detection threshold, as compared with FIG. 3A, in comparison with a calibrated charge reference on the charge detection cylinder.

In any case, the target number of charges 28 generated by the charge generator CG and transported to, and in contact with, the outer surface of the charge detection cylinder CD and/or the charge induced on the charge detection cylinder CD by the operation of the charge generator CG, operate to set the charge detection cylinder CD to a substantially predictable and repeatable target charge level $CH_T$, as illustrated by example in FIG. 3B. The target charge level $CH_T$ establishes a "new" reference charge level against which subsequent charge detection events are measured. As the new reference charge level $CH_T$ is substantially repeatable, a substantial reduction in the charge difference between a charge detection threshold $CH_{TH3}$ and $CH_T$ can be realized as also illustrated in FIG. 3B, thereby increasing the range of detectable ion charge as compared with conventional ELITs.

Figure 4A:
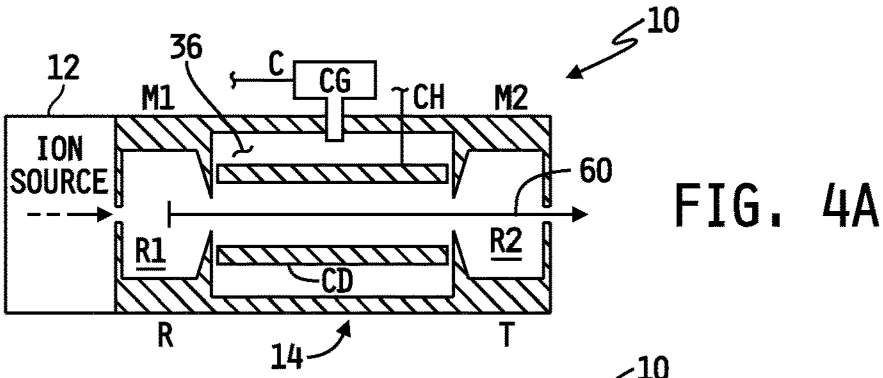
FIGS. 4A-4E are simplified diagrams of the ELIT of FIG. 1 demonstrating sequential control and operation of the ion mirrors and of the charge generator to calibrate or reset the charge detector between ion measurement events.

Referring now to FIGS. 4A-4E, simplified diagrams of the ELIT 14 of FIG. 1 are shown demonstrating sequential control and operation of the ion mirrors M1, M2, as described above, and of the charge generator CG to calibrate or reset the charge detection cylinder CD between ion measurement events. Referring to FIG. 4A, the ELIT 14 has just concluded an ion measurement event in which an ion was trapped in the ELIT 14 and in which the processor 16 was operable to control the voltage sources V1, V2 to control the ion mirrors M1, M2 to the ion reflection modes of operation (R) in which ion reflection electric fields were established in the regions R1, R2 of each respective ion mirror M1, M2. The ion thus oscillated back and forth between M1 and M2, each time passing through the charge detection cylinder CD whereupon the charge induced thereby on the charge detection cylinder CD was detected by the charge preamplifier CP and the ion detection event was recorded by the processor 16. After the ion had oscillated back and forth through the ELIT 14 between the ion mirrors M1, M2 a selected number of times or for a selected time period, the processor 16 was operable to control the voltage source V2 to control the ion mirror M2 to the ion transmission mode (T) of operation by establishing an ion transmission field within the region R2 of the ion mirror M2, while maintaining the ion mirror M1 in the ion reflection mode (R) of operation as illustrated in FIG. 4A. As a result, the trapped ion exits the ion mirror M2 via the aperture A2 of M2 as illustrated by the ion trajectory 60 in FIG. 4A.

Figure 4B:
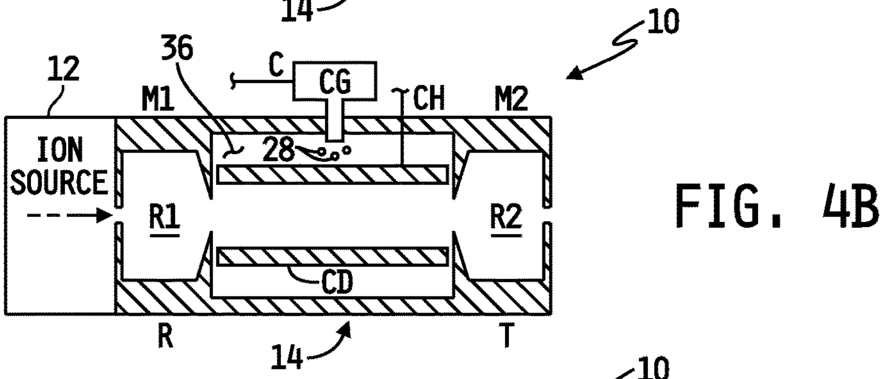

When the ELIT 14 has been operating in the state illustrate in FIG. 4A for a selected time period, or for a selected time period in which no charge detection events occur, the processor 16 is operable to supply a control signal C to the charge generator CG to cause the charge generator CG to controllably generate a target number of free charges 28 and supply the free charges 28 to the space 36 defined between the ground cylinder GC and the charge detection cylinder CD, as illustrated in FIG. 4B. In charge injection operation of the charge generator CG, the generated free charges 28 travel toward, and into contact with, the external surface of the charge detection cylinder CD through the field-free region 36 as described above. In charge induction operation, an electric field established by the charge generator voltage source VCG or other electric field generation structure induces a charge, on the charge detection cylinder CD. As the ion mirror M1 has been in the reflection mode (R) of operation and the ion mirror M2 has been in the transmission mode (T) of operation for a time period sufficient to clear the ELIT 14 of an ions, no ions are transported through the charge detection cylinder CD as the free charges 28 are generated and travel to the charge detection cylinder CD during charge injection operation. As such, the target number of charges 28 generated by the charge generator CG contacting the outer surface of the charge detection cylinder CD and imparting their charges thereon operate to calibrate or reset the charge detection cylinder CD to a substantially constant, predictable and repeatable target charge level $CH_T$ as described above. In charge induction operation, the charge induced on the charge detection cylinder CD by the electric field established by the charge generator CG may similarly be used for calibration and/or reset.

Figure 4C:
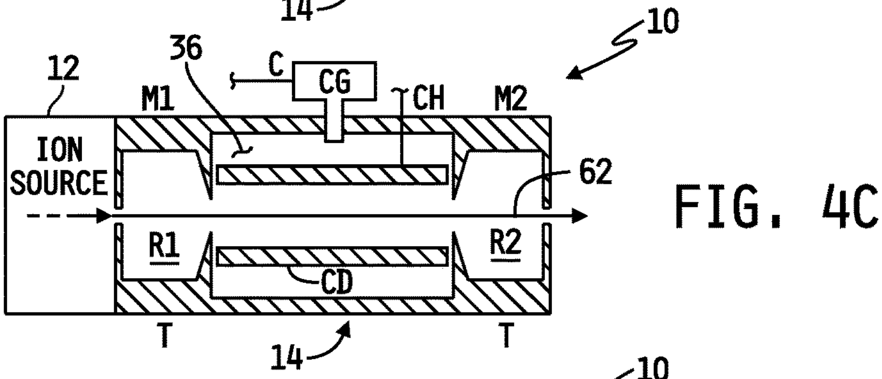

Referring now to FIG. 4C, after the charge detection cylinder CD has been calibrated to the target charge level $CH_T$, the processor 16 is operable to control the voltage source V1 to control the ion mirror M1 to the ion transmission mode of operation (T) by establishing an ion transmission field within the region R1 of the ion mirror M1, while also maintaining the ion mirror M2 in the ion transmission mode (T) of operation. As a result, ions generated by the ion source 12 and entering the ion mirror M1 are passed through the ion mirror M1, through the charge detection cylinder CD, through the ion mirror M2 and out of the ion mirror M2 via the aperture A1 of the ion mirror M2 as described above and as illustrated by the ion trajectory 62 in FIG. 4C. In some embodiments, a conventional ion detector 25, e.g., one or more microchannel plate detectors, is positioned adjacent to the ion exit aperture A1 of the ion mirror M2, and ion detection information provided by the detector 25 to the processor 16 may be used to adjust one or more of the components and/or operating conditions of the ELIT 14 to ensure adequate detection of ions passing through the charge detection cylinder CD.

Figure 4D:
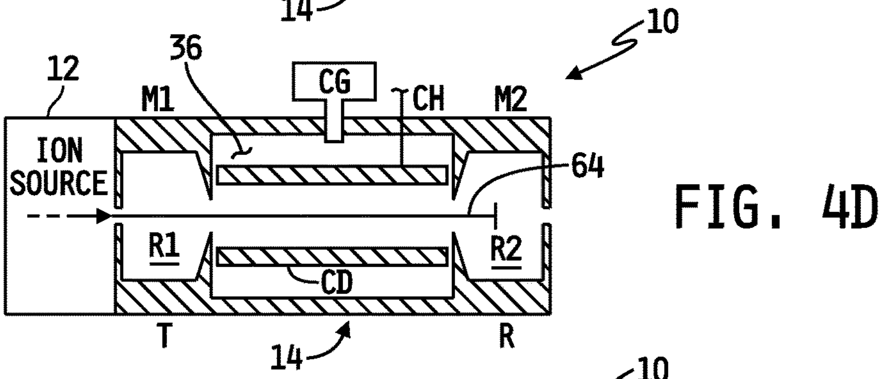

Referring now to FIG. 4D, after both of the ion mirrors M1, M2 have been operating in ion transmission operating mode for a selected time period, the processor 16 is operable to control the voltage source V2 to control the ion mirror M2 to the ion reflection mode (R) of operation by establishing an ion reflection field within the region R2 of the ion mirror M2, while maintaining the ion mirror M1 in the ion transmission mode (T) of operation as shown. As a result, ions generated by the ion source 12 and entering the ion mirror M1 are passed through the ion mirror M1, through the charge detection cylinder CD, and into the ion mirror M2 where they are reflected back into the charge detection cylinder CD by the ion reflection field (R) established in the region R2 of M2, as illustrated by the ion trajectory 64 in FIG. 4D.

Figure 4E:
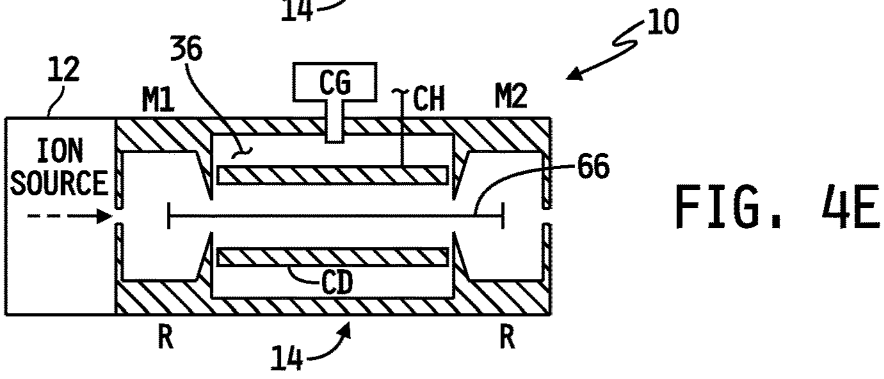

Referring now to FIG. 4E, the processor 16 is operable to control the voltage source V1 to control the ion mirror M1 to the ion reflection mode (R) of operation by establishing an ion reflection field within the region R1 of the ion mirror M1, while maintaining the ion mirror M2 in the ion reflection mode (R) of operation as shown. In one embodiment, the processor 16 is illustratively operable, i.e., programmed, to control the ELIT 14 in a "random trapping mode" in which the processor 16 is operable to control the ion mirror M1 to the reflection mode (R) of operation after the ELIT has been operating in the state illustrated in FIG. 4D, i.e., with M1 in ion transmission mode and M2 in ion reflection mode, for a selected time period. Until the selected time period has elapsed, the ELIT 14 is controlled to operate in the state illustrated in FIG. 4D. In an alternate embodiment, the processor 16 is operable, i.e., programmed, to control the ELIT 14 in a "trigger trapping mode" in which the processor 16 is operable to control the ion mirror M1 to the reflection mode (R) of operation until an ion is detected at the charge detector CD. Until such detection, the ELIT 14 is controlled to operate in the state illustrated in FIG. 4D. Detection by the processor 16 of a charge on the charge detector CD is indicative of an ion passing through the charge detector CD toward the ion mirror M1 or toward the ion mirror M2, and serves as a trigger event which causes the processor 16 to control the voltage source V1 to switch the ion mirror M1 to the ion reflection mode (R) of operation to thereby trap the ion within the ELIT 14.

With both of the ion mirrors M1, M2 controlled to the ion reflection operating mode (R), the ion is made to oscillate back and forth between the regions R1 and R2 of the respective ion mirrors M1, M2 by the ion reflection electric fields established therein, as described above and as illustrated by the ion trajectory 66 depicted in FIG. 4E. In one embodiment, the processor 16 is operable to maintain the operating state illustrated in FIG. 4E until the ion passes through the charge detection cylinder CD a selected number of times. In an alternate embodiment, the processor 16 is operable to maintain the operating state illustrated in FIG. 4E for a selected time period after controlling M1 to the ion reflection mode (R) of operation. When the ion has passed through the charge detection cylinder CD a selected number of times or has oscillated back-and-forth between the ion mirrors M1, M2 for a selected period of time, the processor 16 is operable, i.e., programmed, to control the voltage source V2 to control the ion mirror M2 to the ion transmission mode (T) of operation by establishing an ion transmission field within the region R2 of the ion mirror M2, while maintaining the ion mirror M1 in the ion reflection mode (R) of operation as illustrated in FIG. 4A. The process then repeats for as many times as desired.

The charge cylinder calibration or reset technique described with respect to FIGS. 4A-4E may alternatively or additionally be implemented with the ELIT 14 between charge detection events. It will be understood, however, that in such embodiments dimensions of the ELIT 14, and the axial lengths of the ion mirrors M1, M2 in particular, must be sized to allow for the activation of and subsequent generation of the free charges 28 by the charge generator GC, the deposition of the generated free charges 28 on the external surface of the charge detection cylinder CD and stabilization of the resulting target charge level $CH_T$ on the charge detection cylinder CD, and/or of charge inducement on the charge detection cylinder CD by a suitably established electric field, all between the time that a trapped ion traveling through the ELIT 14 leaves the charge detection cylinder CD and is reflected back into the charge detection cylinder by one of the ion mirrors M1, M2.

Figure 5A:
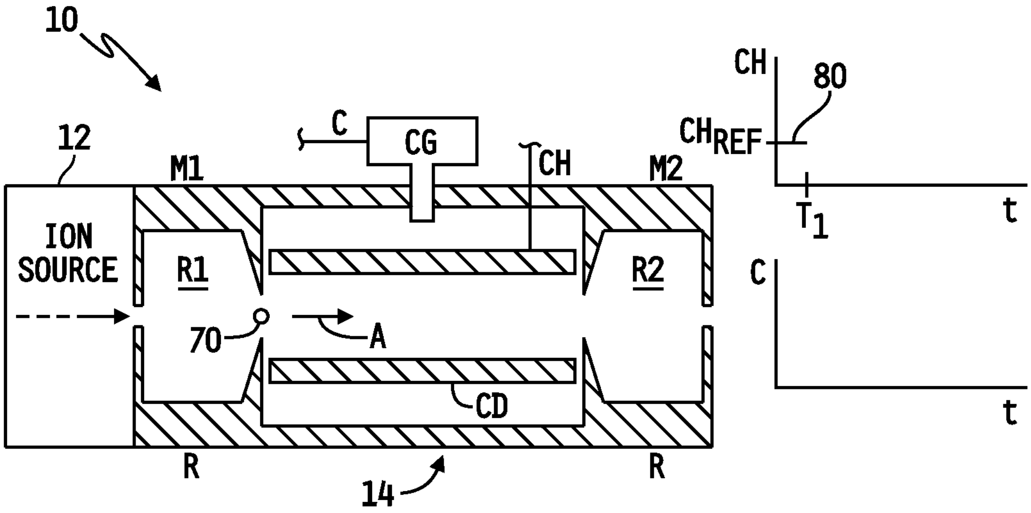
FIGS. 5A-5F are simplified diagrams of the ELIT of FIG. 1 demonstrating control and operation of the charge generator to calibrate or reset the charge detector between charge detection events.
Figure 5B:
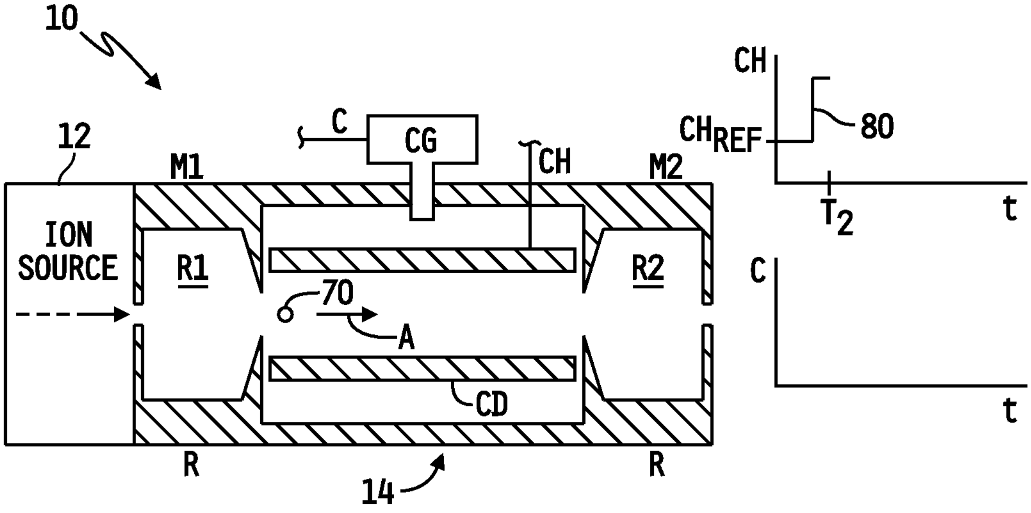
Figure 5C:
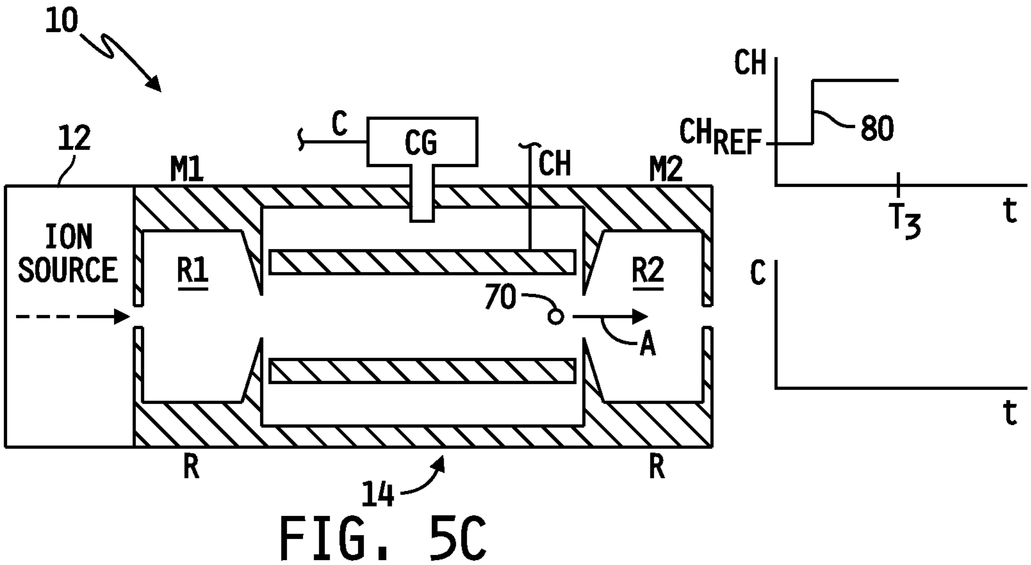

Referring now to FIGS. 5A-5F, simplified diagrams of the ELIT 14 of FIG. 1 are shown demonstrating sequential control and operation of the ion mirrors M1, M2, as described above, and of the charge generator CG to calibrate or reset the charge detection cylinder CD between such charge detection events. Referring to FIG. 5A, a single ion 70 is shown traveling through the ELIT 14 at a time T1 in the direction of the arrow A from the region R1 of the ion mirror M1 toward the charge detection cylinder CD. As illustrated in the accompanying plot of charge CH on the charge detection cylinder CD vs. time, the detected charge signal 80 is at the charge reference $CH_{REF}$. In FIG. 5B, the ion 70 is shown at a subsequent time T2 in which it has progressed along the direction A of travel and entered the charge detection cylinder CD. The detected charge signal 80 accordingly shows a step just prior to T2 indicative of the detected charge induced on the charge detection cylinder CD by the ion 70 contained therein. At a further subsequent time T3, the ion 70 has progressed further along the direction A of travel and has approached the end of the charge detection cylinder CD, as illustrated in FIG. 5C. The peak of the charge detection signal 80 is accordingly reaching its end at T3.

Figure 5D:
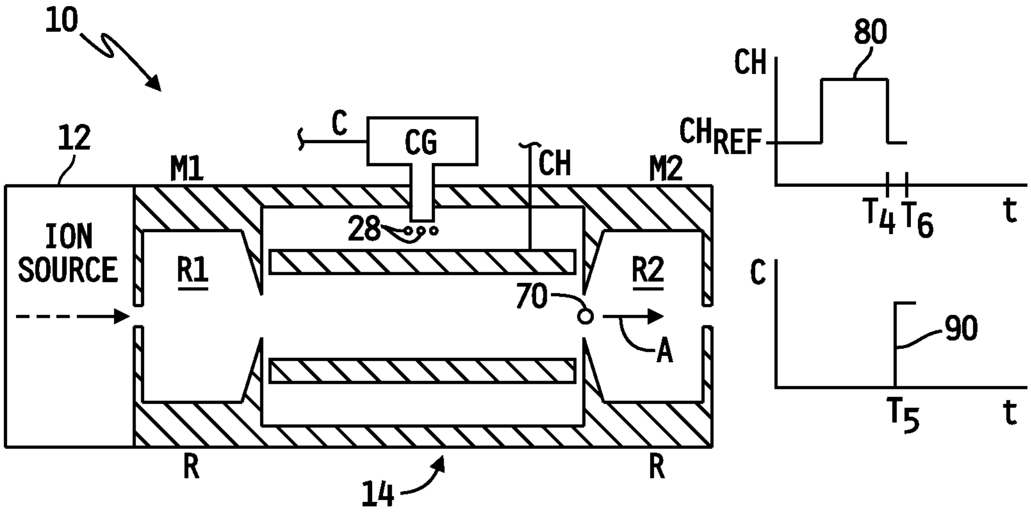

At still a further subsequent time T4, the ion 70 still traveling in the direction A has just exited the charge detection cylinder CD and is poised to enter the region R2 of the ion mirror M2 as illustrated in FIG. 5D. Upon detecting the attendant falling edge of the charge detection signal 80 at time T4, i.e., upon detection by the processor 16 of the absence of the charge detection signal that is produced by the charge preamplifier CP when an ion is passing through the charge detection cylinder CD and is inducing its charge on the charge detection cylinder, the processor 16 is operable to produce the control signal C at time T5 to activate the charge generator CG as indicated by the rising edge of the control signal 90. At a subsequent time T6, the charge generator CG is responsive to the control signal C to produce a selected number of free charges 28, and such free charges 28 then travel through the field-free region 36 and into contact with the exterior surface of the charge detection cylinder CD to deposit the target number of free charges 28 thereon. Alternatively or additionally, the charge generator CG may be responsive to the control signal C to generate an electric field between the at least one charge outlet passage 24 and the charge detection cylinder CD which induces a corresponding charge, on the charge detection cylinder CD.

Figure 5E:
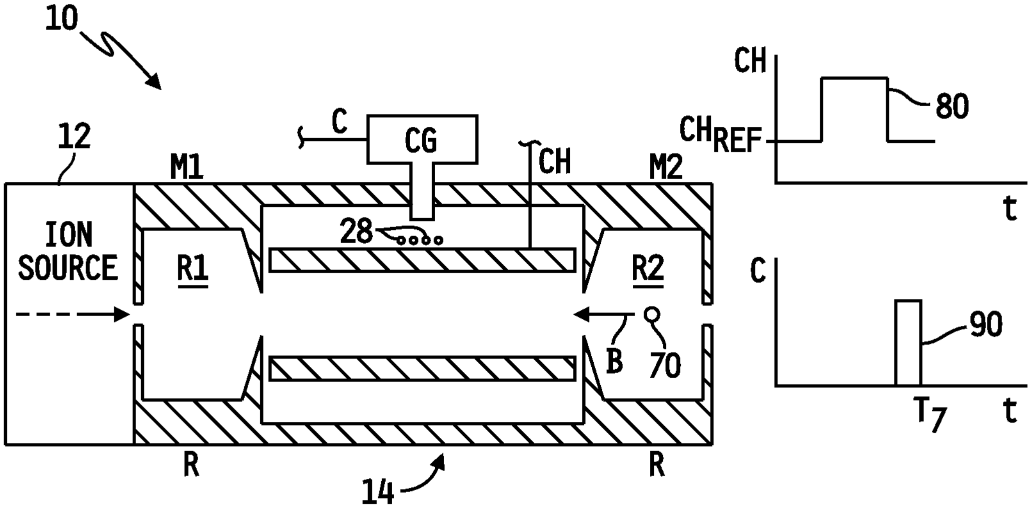
Figure 5F:
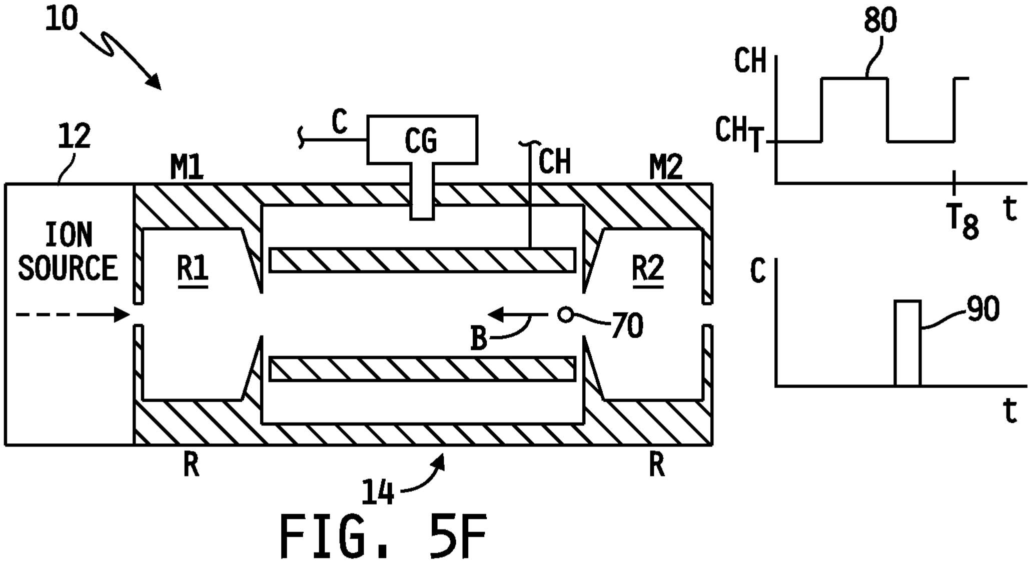

At a subsequent time T7, the ion reflection electric field (R) established in the region R2 of the ion mirror M2 has trapped and reversed the direction of the ion 70 so that it is now traveling in the opposite direction B toward the entrance of the charge detection cylinder CD adjacent to the ion mirror M2 as illustrated in FIG. 5E. The processor 16 has deactivated the control signal C at T7 as indicated by the falling edge of the control signal 90. In response to deactivation of the control signal C, the charge generator CG has stopped generating free charges 28, and the last of the generated charges 28 are shown in FIG. 5E moving toward the exterior surface of the charge detection cylinder CD. Alternatively or additionally, the charge generator CG may be responsive to the control signal C at T7 to stop generating the electric field described above. Thereafter at time T8, the ion 70 traveling in the direction B has reentered the charge detection cylinder CD as indicated by the rising edge of the charge detection signal 80 at T8 as illustrated in FIG. 5F. Between T7 and T8, the generated free charges 28 deposited on the charge detection cylinder CD settle and stabilize to result in the target charge level $CH_T$ on the charge detection cylinder CD which becomes the new charge reference for the charge detection signal 80 as also illustrated in FIG. 5F. Alternatively or additionally, calibration or reset may be accomplished via charge induction as described above. A process identical to that illustrated in FIGS. 5A-5F occurs at the opposite end of the ELIT 14 and continues with each oscillation of the ion 70 within the ELIT 14 until the ion mirror M2 is opened to allow the ion 70 to exit the aperture A1 thereof.

EXAMPLES

The following examples are provided to illustrate three specific applications; one in which the charge generator CG is controlled to selectively produce free charges 28 as part of a charge injection process to deposit or impart a respective net charge on the charge detection cylinder CD, one in which the charge generator CG is controlled as part of a charge induction process to selectively induce a charge on the charge detection cylinder, and one in which the charge generator CG is controlled as part of a charge preamplifier calibration process to selectively induce a high frequency charge on the charge detection signal during normal operation of the ELIT in which mass and charge of a charged particle is measured thereby, to process the detected high frequency charges and to use the information provided thereby to compensate for any drift in gain of the charge preamplifier over time. It will be understood that such applications are provided only by way of example, and should not be understood to limit the concepts described herein in any way.

The first example application is specifically targeted at embodiments in which the charge sensitive preamplifier does not include any feedback components, or at least in which the charge sensitive preamplifier does not include any feedback components operable to bleed or otherwise dissipate or remove charges that may build up or otherwise accumulate on the charge detection cylinder CD as charges are induced thereon by trapped ions passing therethrough. In such embodiments, charge that builds up or accumulates on the charge detection cylinder raises the base charge level at the input of the charge sensitive preamplifier, thus causing the output of the charge preamplifier to drift upwardly and, eventually, to the level of the supply voltage of the charge sensitive preamplifier. In such embodiments, the charge generator CG is configured to operate in charge injection mode, and the processor 16 is operable to control the charge generator CG to generate free charges 28 of appropriate polarity and quantity which, when deposited or imparted on the charge detection cylinder CD, counteracts the accumulated or built up charge thereby resetting the charge level of the charge detection cylinder CD and the input of the charge sensitive preamplifier to the reference charge level $CH_{REF}$ or other selectable charge level.

The second example application is specifically targeted at embodiments in which the charge generator is configured to operate in charge induction mode to counteract or at least reduce charges induced on the charge detection cylinder CD by electric field transients produced when switching either or both of the ion mirrors M1, M2 between ion transmission and ion reflection modes as described above. Generally, each time the voltage source V1 and/or V2 is controlled by the processor 16 to modify the respective voltages applied to the ion mirror M1 and/or the ion mirror M2 to switch from an ion transmission electric field TEF to an ion reflection electric field REF or vice versa, the switching from one electric field to the other creates an electric field transient which induces a corresponding transient charge on the charge detection cylinder CD. This transient charge, at least in some instances, saturates the output of the charge sensitive preamplifier for some period of time, and in other instances causes the charge sensitive preamplifier to produce one or more pulses detectable by the processor 16. In either instance, such outputs produced by the charge sensitive preamplifier do not correspond to charges induced on the charge detection cylinder CD by a trapped ion passing therethrough, and following any such switching of either ion mirror M1, M2 or simultaneously of both ion mirrors M1, M2 charge detection data collection by the processor 16 is conventionally paused or delayed for a period of time to allow the transient charge induced on the charge detection cylinder CD to dissipate. In this regard, the processor 16 is operable in this second example to control the charge generator CG and/or the voltage source VCG to produce a counter-pulse each time one or both of the ion mirrors M1, M2 is/are switched between ion transmission and reflection modes, wherein such counter-pulse induces a charge on the charge detection cylinder CD equal or approximately equal and opposite to the transient charge induced on the charge detection cylinder CD by the switching of the ion mirror(s) M1 and/or M2 so as to counteract or at least reduce the net transient charge induced on the charge detection cylinder by such switching of the ion mirror(s) M1 and/or M2. Illustratively, the shape, duration and/or magnitude of the voltage counter-pulse produced by the voltage source VCG is controlled to create an electric field between the charge generator CG and the charge detection cylinder CD having a corresponding shape, duration and/or magnitude to induce a charge on the charge detection cylinder which is equal and opposite to the transient charge induced on the charge detection cylinder CD by the switching of the ion mirror(s) M1, M2. Such counter-pulsing by the voltage source VCG illustratively avoids saturating the charge preamplifier CP and, in any case, provides for the processing of charge detection data following switching of the ion mirror(s) M1 and/or M2 much sooner than in conventional ELIT and/or CDMS instruments.

It will be understood that the transient charge induced on the charge detection cylinder CD by the switching of the ion mirror M1 may be different from that induced by the switching of the ion mirror M2, either of which may be different from that induced when simultaneously switching both ion mirrors M1, M2, and that any such transient charges induced on the charge detection cylinder CD when switching either or both ion mirrors M1, M2 from transmission mode to reflection mode may be different than when switching from reflection mode to transient mode. The processor 16 may thus be programmed in this example application to control the shape, duration and/or magnitude of the voltage counter-pulse produced by the voltage source VCG differently, depending upon how and which of the ion mirrors M1, M2 (or both) are being switched, to selectively create an appropriate electric field between the charge generator CG and the charge detection cylinder CD which has a corresponding shape, duration and/or magnitude to induce a charge on the charge detection cylinder which is equal and opposite to any such transient charge being induced on the charge detection cylinder CD by such switching of the ion mirror(s) M1 and/or M2.

Figure 7:
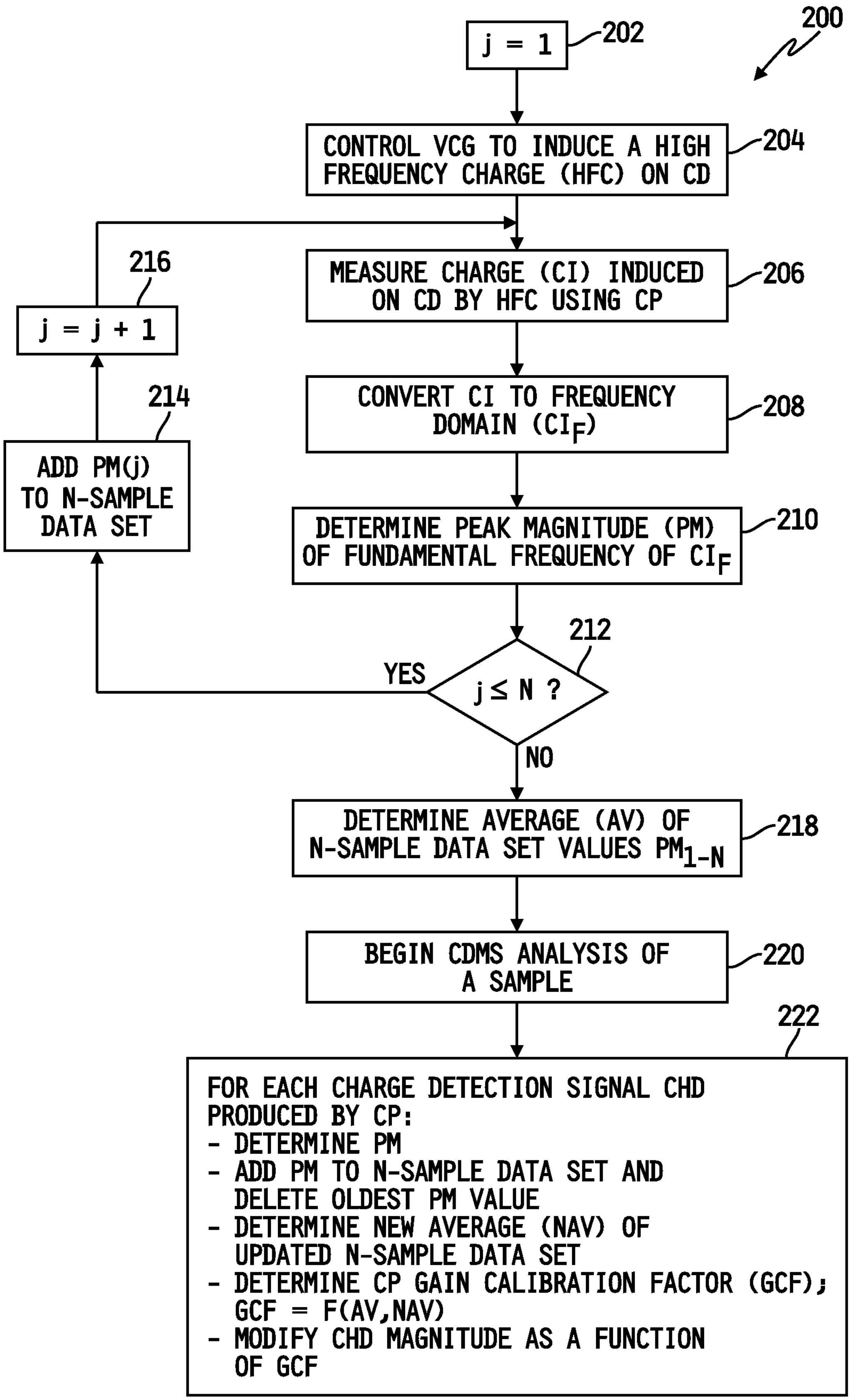
FIG. 7 is a simplified flowchart of an embodiment of a process for controlling the charge generator of FIG. 1 to selectively induce high frequency charges on the charge detection cylinder during normal operation of the ELIT in which mass and charge of charged particles are measured thereby, to process the detected high frequency charges and to use information provided thereby to compensate for any drift in gain of the charge preamplifier over time.

The third example application is specifically targeted at embodiments in which the charge sensitive preamplifier may be susceptible to drift in gain over time, e.g., due to one or any combination of, but not limited to, amplifier operating temperature, amplifier operating temperature gradients, and signal history. In such embodiments, the charge generator CG is illustratively controlled to selectively induce high frequency charges on the charge detection cylinder CD during normal operation of the ELIT 14 in which mass and charge of charged particles are measured thereby as described herein, to process the detected high frequency charges and to use information provided thereby to compensate for any drift in gain of the charge sensitive preamplifier CP over time. In this regard, the simplified flowchart of FIG. 7 illustrates an example process 200 for controlling the charge generator voltage source VCG and/or the charge generator CG to continually induce high frequency charges on the charge detection cylinder CD and to use the corresponding information in the resulting charge detection signals CHD to compensate for gain drift in the charge sensitive preamplifier over time. The process 200 is illustratively stored in the memory 18 in the form of instructions executable by the processor 16 to control operation of the charge generator voltage source VCG and/or the charge generator CG and to process the charge detection signals CHD as just described.

In this regard, the process 200 begins at step 202 where the processor 16 is operable to set a counter, j, equal to 1 or some other starting value. Thereafter at step 204 the processor 16 is operable to control the voltage source VCG and/or the charge generator CG to produce a high frequency voltage of suitable constant or stable magnitude to create a corresponding high-frequency electric field between the outlet 26, e.g., in the form of an antenna or other suitable structure, of the charge generator CG and the charge detection cylinder CD which induces a corresponding high frequency charge on the charge detection cylinder CD. The term "high frequency," as used in this embodiment, should be understood to mean a frequency that is at least high enough so that the resulting portion of the frequency domain charge detection signal CHD during normal operation of the ELIT 14 is distinguishable from the portion of CHD resulting from detection of charge induced by a charged particle, i.e., an ion, passing through the charge detection cylinder. In this regard, the "high frequency" should at least be higher than the highest oscillation frequency of any ion oscillating back and forth in the ELIT 14 as described above. The high frequency voltage produced by VCG and/or CG may take any shape, e.g., square, sinusoidal, triangular, etc., and have any desired duty cycle. In one example embodiment, which should not be considered limiting in any way, the high frequency voltage produced at the antenna 26 is a square wave which, in the frequency domain, includes only the fundamental frequency and odd harmonics.

Following step 204, the process 200 advances to step 206 where the processor 16 is operable to measure the charge, CI, induced on the charge detector CD by the high frequency signal produced at the antenna 26 by processing the corresponding charge detection signal CHD produced by the charge sensitive preamplifier CP. Thereafter at step 208, the processor 16 is operable to convert the time-domain charge detection signal CHD to a frequency domain charge detection signal, CIF, e.g., using any conventional signal conversion technique such a discrete Fourier transform (DFT), fast Fourier transform (FFT) or other conventional technique. Thereafter at step 210, the processor 16 is operable to determine the peak magnitude, PM, of the fundamental frequency of the charge detection signal CIF. Thereafter at step 212, the processor 16 is operable to compare the counter value, j, to a target value, N. Generally, N will be the sample size of a data set containing multiple, sequentially measured values of PM, and will define the size of a moving average window used to track the drift of the charge sensitive preamplifier CP. In this regard, N may have any positive value. Generally, lower values of N will produce a more responsive but less smooth moving average, and higher values of N will conversely produce a less responsive but more smooth moving average. Typically, N will be selected based on the application. In one example application, which should not be considered limiting in any way, N is 100, although in other applications N may be less than 100, several hundred, 1000 or several thousand.

If, at step 212, the processor 16 determines that j is less than or equal to N, the process 200 advances to step 214 where the processor 16 is operable to add PM(j) to an N-sample data set stored in the memory 18. Thereafter at step 216, the processor is operable to increment the counter, j, and to then loop back to step 206. If, at step 212, the processor 216 instead determines that j is greater than N, the process 200 advances to step 218 where the processor 16 is operable to determine an average, AV, of the N-sample data set value $PM_{1-N}$. In one embodiment, the processor 16 is illustratively operable at step 218 to compute AV as an algebraic average of $PM_{1-N}$, although in alternate embodiments the processor 16 may be operable at step 218 to compute AV using one or more other conventional averaging techniques or processes.

Steps 202-218 of the process 200 are illustratively executed prior to operation of the instrument 10 to measure a spectrum of masses and charges of ions generated from a sample as described herein. In this regard, the purpose of steps 202-218 is to build an N-sample data set of peak magnitude values PM and to establish a baseline gain or gain factor, AV, of the charge sensitive preamplifier CP prior to normal operation of the ELIT 14 to measure ion mass and charge as described herein. It will be understood, however, that in other embodiments steps 202-218 may be re-executed at any time, e.g., randomly, periodically or selectively, to reestablish the baseline gain or gain factor.

Following step 218, the processor 16 is illustratively operable to begin a CDMS analysis of a sample by the instrument 10 as described herein, e.g., by controlling the voltage sources V1 and V2 to measure masses and charges of ions generated from a sample with the ELIT 14. Thereafter at step 222, as such operation of the instrument 10 and ELIT 14 is taking place, and as the charge generator CG is continually controlled to induce the high frequency charge HFC on the charge detection cylinder CD, the processor 16 is operable, for each charge detection signal CHD produced by the charge sensitive preamplifier in response to a charge induced on the charge detection cylinder CD by a charged particle passing therethrough, to (a) determine PM, e.g., in accordance with steps 206-210 or other conventional process for determining PM, (b) add PM to the N-sample data set and delete the oldest PM value so as to advance the N-sample data set "window" by one data point, (c) determine a new average, NAV, of the now updated N-sample data set, e.g., in accordance with step 218 or other conventional averaging techniques, (d) determine a charge sensitive preamplifier gain calibration factor, GCF, as a function of AV and NAV, and (e) modify the portion of the charge detection signal CHD produced by the charge sensitive preamplifier in response to a charge induced on the charge detection cylinder CD by a charged particle passing therethrough as a function of GCF to compensate for any drift in gain of the charge sensitive preamplifier CP.

It will be understood that any of several conventional techniques may be used by the processor 16 at step 222(*d*) to determine GCF. In one embodiment, for example, GCF may be the ratio GCF=NAV/AV or GCF=AV/NAV. In other embodiments, AV may be normalized, e.g., to a value of 1 or some other value, and NAV may be similarly normalized as a function of the normalized AV to produce GCF in the form of a normalized multiplier. Other techniques will occur to those skilled in the art, and it will be understood that any such other techniques are intended to fall within the scope of this disclosure. In any case, the processor 16 is illustratively operable at step 222(*e*) to modify the portion of the charge detection signal CHD produced by the charge sensitive preamplifier in response to a charge induced on the charge detection cylinder CD by a charged particle passing therethrough to compensate for any drift in gain of the charge sensitive preamplifier CP by multiplying the peak magnitude of this portion of the charge detection signal CH by GCF. Those skilled in the art will recognize other techniques for executing step 222(*e*) to include in GCF other factors that may affect the gain of CP, to include one or more weighting values to boost or attenuate the gain of CP based on one or more factors, or the like.

Figure 8:
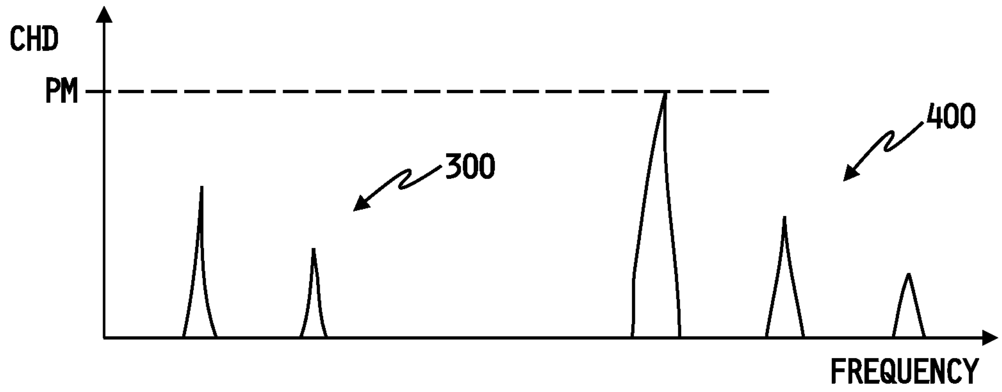
FIG. 8 is a plot of the charge detection signal vs. frequency depicting an example of the charge detection signal which includes charge peaks corresponding to detection of charge induced on the charge detection cylinder of the ELIT by a charged particle passing therethrough and additional charge peaks corresponding to detection of the high frequency charge simultaneously induced on the charge detection cylinder by the charge generator according to the process illustrated in FIG. 7.

Referring now to FIG. 8, an example plot of CHD vs. frequency is shown depicting an example of the charge detection signal CHD processed at step 222(*a*) which includes charge peaks 300 corresponding to detection of charge induced on the charge detection cylinder CD of the ELIT 14 by a charged particle passing therethrough and additional charge peaks 400 corresponding to detection of the high frequency charge HFC simultaneously induced on the charge detection cylinder CD by the charge generator CG. As described herein, the frequency of the high-frequency charges induced on the charge detection cylinder CD by the antenna 26 of the charge generator CG is at least sufficiently higher than the oscillation frequency of the charged particle oscillating back and forth through the ELIT 14 to enable the two charge sources to be distinguishable from one another. The peak magnitude PM of the fundamental frequency of the induced high frequency charge HFC determined at step 222(*a*) of the process 200 is also illustrated in FIG. 8.

Figure 9:
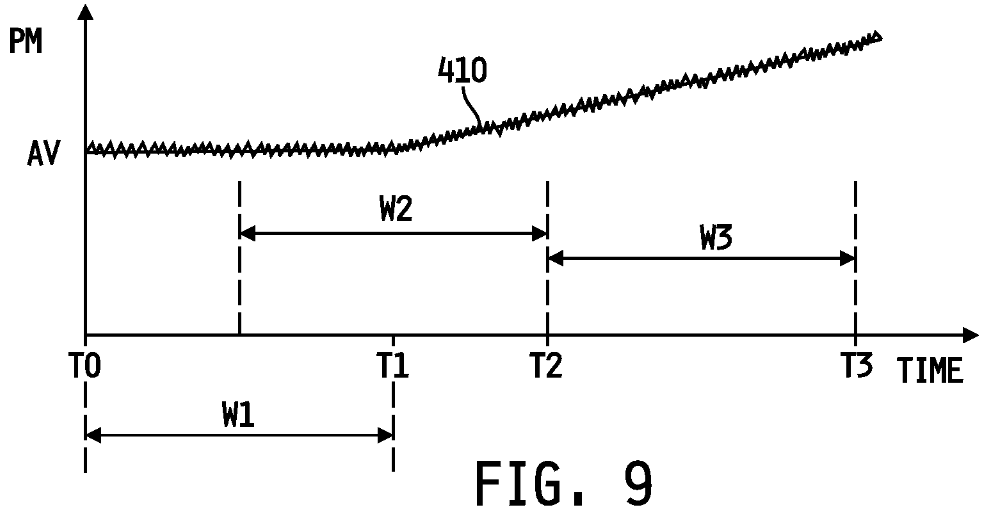
FIG. 9 is a plot of the peak magnitude of the fundamental frequency of the high frequency charge induced on the charge detection cylinder by the charge generator over time.

Referring to FIG. 9, an example plot of the peak magnitude PM of the fundamental frequency of the high frequency charge HFC induced on the charge detection cylinder CG by the charge generator vs. time 410 is shown which includes the baseline gain value AV computed at step 218 and which includes an example drift in the gain of the charge sensitive preamplifier CP over time during operation of the instrument 10. It will be understood that whereas FIG. 9 depicts the gain drift as being linearly increasing over time, the gain drift may alternatively be non-linear or piecewise liner and/or may decrease over time or increase at times and decrease at others. In any case, the baseline gain value AV computed at step 218 occurs during the time window W1 between times TO and T1, step 220 is executed at time T1, and the charge sensitive preamplifier gain drifts thereafter between T1 and T3. FIG. 9 further depicts progressive movement of the N-sample time window repeatedly executed at step 222(*b*), i.e., with each charge detection signal CHD resulting from a charge induced on the charge detection cylinder CD by a charged particle passing therethrough. One such example time window W2 is shown extending from midway between TO and T1 to T2, and another example time window W3 is shown extending between times T2 and T.

Figure 10:
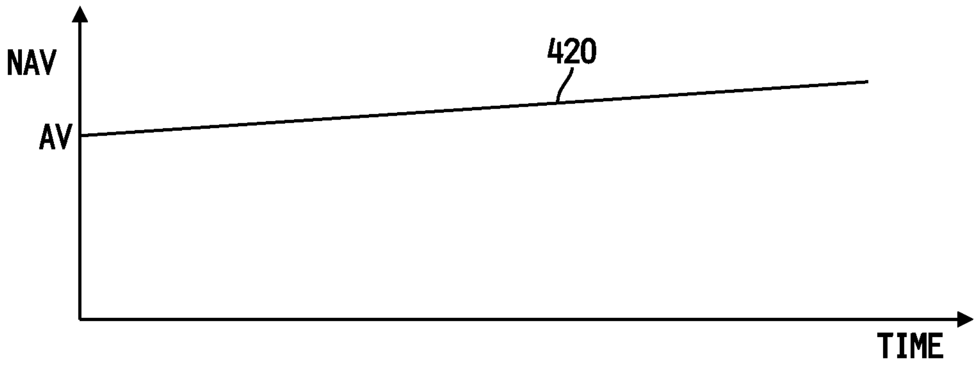
FIG. 10 is a plot of an N-sample data set moving average over time of the peak magnitude signal illustrated in FIG. 9.

Referring now to FIG. 10, a plot is shown of an N-sample data set moving average (NAV) 420 over time of the peak magnitude signal 410 illustrated in FIG. 9, as determined by the processor 16 at step 222(*c*) of the process 200. In the illustrated example, the moving average NAV smooths the peak magnitude signal 410 to a linearly increasing function from the baseline gain or gain factor AV. As described above, NAV and AV are illustratively used by the processor 16 at steps 222(*d*) and 222(*e*) to modify the portion of the charge detection signal CHD produced by the charge sensitive preamplifier in response to a charge induced on the charge detection cylinder CD by a charged particle passing therethrough to compensate for any drift in gain of the charge sensitive preamplifier CP by multiplying the peak magnitude of this portion of the charge detection signal CH by GCF.

Figure 6A:
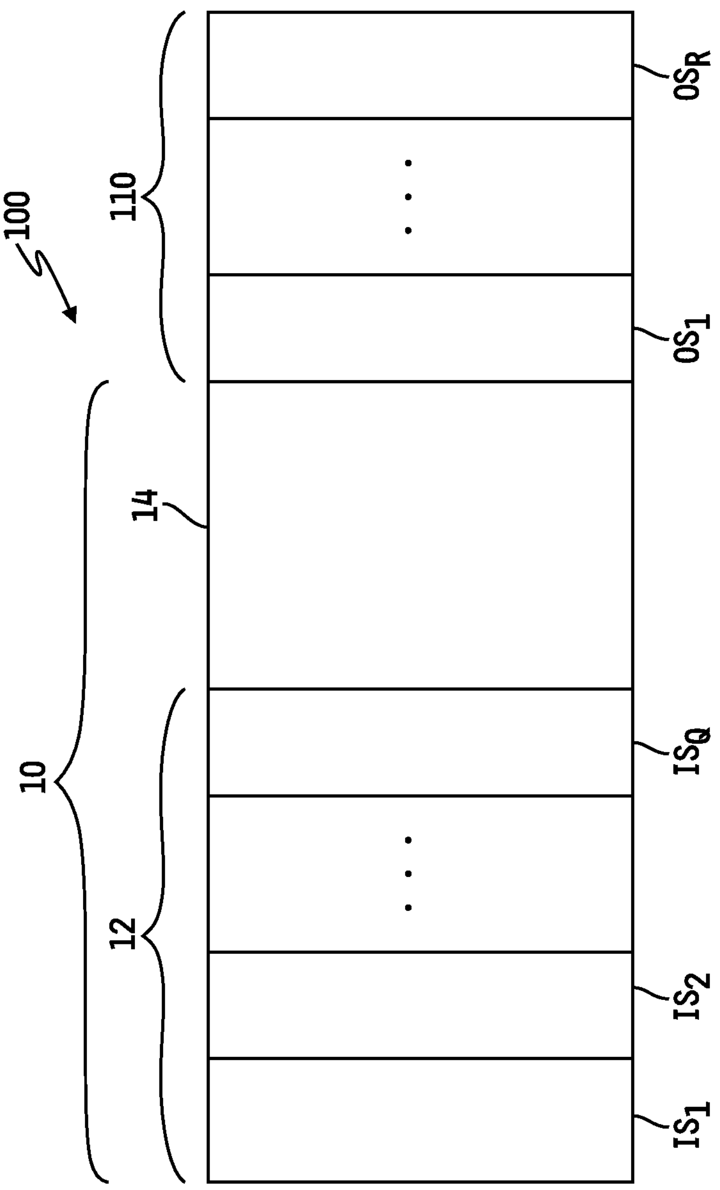
FIG. 6A is a simplified block diagram of an embodiment of an ion separation instrument including the ELIT illustrated and described herein and showing example ion processing instruments which may form part of the ion source upstream of the ELIT and/or which may be disposed downstream of the ELIT to further process ion(s) exiting the ELIT.

Referring now to FIG. 6A, a simplified block diagram is shown of an embodiment of an ion separation instrument 100 which may include the ELIT 14 illustrated and described herein, and which may include the charge detection mass spectrometer (CDMS) 10 illustrated and described herein, and which may include any number of ion processing instruments which may form part of the ion source 12 upstream of the ELIT 14 and/or which may include any number of ion processing instruments which may be disposed downstream of the ELIT 14 to further process ion(s) exiting the ELIT 14. In this regard, the ion source 12 is illustrated in FIG. 6A as including a number, Q, of ion source stages $IS_1$—$IS_Q$ which may be or form part of the ion source 12. Alternatively or additionally, an ion processing instrument 110 is illustrated in FIG. 6A as being coupled to the ion outlet of the ELIT 14, wherein the ion processing instrument 110 may include any number of ion processing stages $OS_1$—$OS_R$, where R may be any positive integer.

Focusing on the ion source 12, it will be understood that the source 12 of ions entering the ELIT 14 may be or include, in the form of one or more of the ion source stages $IS_1$—$IS_Q$, one or more conventional sources of ions as described above, and may further include one or more conventional instruments for separating ions according to one or more molecular characteristics (e.g., according to ion mass, ion mass-to-charge, ion mobility, ion retention time, or the like) and/or one or more conventional ion processing instruments for collecting and/or storing ions (e.g., one or more quadrupole, hexapole and/or other ion traps), for filtering ions (e.g., according to one or more molecular characteristics such as ion mass, ion mass-to-charge, ion mobility, ion retention time and the like), for fragmenting or otherwise dissociating ions, for normalizing or shifting ion charge states, and the like. It will be understood that the ion source 12 may include one or any combination, in any order, of any such conventional ion sources, ion separation instruments and/or ion processing instruments, and that some embodiments may include multiple adjacent or spaced-apart ones of any such conventional ion sources, ion separation instruments and/or ion processing instruments. In any implementation which includes one or more mass spectrometers, any one or more such mass spectrometers may be implemented in any of the forms described herein.

Turning now to the ion processing instrument 110, it will be understood that the instrument 110 may be or include, in the form of one or more of the ion processing stages $OS_1$—$OS_R$, one or more conventional instruments for separating ions according to one or more molecular characteristics (e.g., according to ion mass, ion mass-to-charge, ion mobility, ion retention time, or the like) and/or one or more conventional ion processing instruments for collecting and/or storing ions (e.g., one or more quadrupole, hexapole and/or other ion traps), for filtering ions (e.g., according to one or more molecular characteristics such as ion mass, ion mass-to-charge, ion mobility, ion retention time and the like), for fragmenting or otherwise dissociating ions, for normalizing or shifting ion charge states, and the like. It will be understood that the ion processing instrument 110 may include one or any combination, in any order, of any such conventional ion separation instruments and/or ion processing instruments, and that some embodiments may include multiple adjacent or spaced-apart ones of any such conventional ion separation instruments and/or ion processing instruments. In any implementation which includes one or more mass spectrometers, any one or more such mass spectrometers may be implemented in any of the forms described herein.

As one specific implementation of the ion separation instrument 100 illustrated in FIG. 6A, which should not be considered to be limiting in any way, the ion source 12 illustratively includes 3 stages, and the ion processing instrument 110 is omitted. In this example implementation, the ion source stage $IS_1$ is a conventional source of ions, e.g., electrospray, MALDI or the like, the ion source stage $IS_2$ is a conventional ion filter, e.g., a quadrupole or hexapole ion guide, and the ion source stage $IS_3$ is a mass spectrometer of any of the types described above. In this embodiment, the ion source stage $IS_2$ is controlled in a conventional manner to preselect ions having desired molecular characteristics for analysis by the downstream mass spectrometer, and to pass only such preselected ions to the mass spectrometer, wherein the ions analyzed by the ELIT 14 will be the preselected ions separated by the mass spectrometer according to mass-to-charge ratio. The preselected ions exiting the ion filter may, for example, be ions having a specified ion mass or mass-to-charge ratio, ions having ion masses or ion mass-to-charge ratios above and/or below a specified ion mass or ion mass-to-charge ratio, ions having ion masses or ion mass-to-charge ratios within a specified range of ion mass or ion mass-to-charge ratio, or the like. In some alternate implementations of this example, the ion source stage $IS_2$ may be the mass spectrometer and the ion source stage $IS_3$ may be the ion filter, and the ion filter may be otherwise operable as just described to preselect ions exiting the mass spectrometer which have desired molecular characteristics for analysis by the downstream ELIT 14. In other alternate implementations of this example, the ion source stage $IS_2$ may be the ion filter, and the ion source stage $IS_3$ may include a mass spectrometer followed by another ion filter, wherein the ion filters each operate as just described.

As another specific implementation of the ion separation instrument 100 illustrated in FIG. 6A, which should not be considered to be limiting in any way, the ion source 12 illustratively includes 2 stages, and the ion processing instrument 110 is again omitted. In this example implementation, the ion source stage $IS_1$ is a conventional source of ions, e.g., electrospray, MALDI or the like, the ion source stage $IS_2$ is a conventional mass spectrometer of any of the types described above. This is the implementation described above with respect to FIG. 1 in which the ELIT 14 is operable to analyze ions exiting the mass spectrometer.

As yet another specific implementation of the ion separation instrument 100 illustrated in FIG. 6A, which should not be considered to be limiting in any way, the ion source 12 illustratively includes 2 stages, and the ion processing instrument 110 is omitted. In this example implementation, the ion source stage $IS_1$ is a conventional source of ions, e.g., electrospray, MALDI or the like, and the ion processing stage $OS_2$ is a conventional single or multiple-stage ion mobility spectrometer. In this implementation, the ion mobility spectrometer is operable to separate ions, generated by the ion source stage $IS_1$, over time according to one or more functions of ion mobility, and the ELIT 14 is operable to analyze ions exiting the ion mobility spectrometer. In an alternate implementation of this example, the ion source 12 may include only a single stage $IS_1$ in the form of a conventional source of ions, and the ion processing instrument 110 may include a conventional single or multiple-stage ion mobility spectrometer as a sole stage $OS_1$ (or as stage $OS_1$ of a multiple-stage instrument 110). In this alternate implementation, the ELIT 14 is operable to analyze ions generated by the ion source stage $IS_1$, and the ion mobility spectrometer $OS_1$ is operable to separate ions exiting the ELIT 14 over time according to one or more functions of ion mobility. As another alternate implementation of this example, single or multiple-stage ion mobility spectrometers may follow both the ion source stage $IS_1$ and the ELIT 14. In this alternate implementation, the ion mobility spectrometer following the ion source stage $IS_1$ is operable to separate ions, generated by the ion source stage $IS_1$, over time according to one or more functions of ion mobility, the ELIT 14 is operable to analyze ions exiting the ion source stage ion mobility spectrometer, and the ion mobility spectrometer of the ion processing stage $OS_1$ following the ELIT 14 is operable to separate ions exiting the ELIT 14 over time according to one or more functions of ion mobility. In any implementations of the embodiment described in this paragraph, additional variants may include a mass spectrometer operatively positioned upstream and/or downstream of the single or multiple-stage ion mobility spectrometer in the ion source 12 and/or in the ion processing instrument 110.

As still another specific implementation of the ion separation instrument 100 illustrated in FIG. 6A, which should not be considered to be limiting in any way, the ion source 12 illustratively includes 2 stages, and the ion processing instrument 110 is omitted. In this example implementation, the ion source stage $IS_1$ is a conventional liquid chromatograph, e.g., HPLC or the like configured to separate molecules in solution according to molecule retention time, and the ion source stage $IS_2$ is a conventional source of ions, e.g., electrospray or the like. In this implementation, the liquid chromatograph is operable to separate molecular components in solution, the ion source stage $IS_2$ is operable to generate ions from the solution flow exiting the liquid chromatograph, and the ELIT 14 is operable to analyze ions generated by the ion source stage $IS_2$. In an alternate implementation of this example, the ion source stage $IS_1$ may instead be a conventional size-exclusion chromatograph (SEC) operable to separate molecules in solution by size. In another alternate implementation, the ion source stage $IS_1$ may include a conventional liquid chromatograph followed by a conventional SEC or vice versa. In this implementation, ions are generated by the ion source stage $IS_2$ from a twice separated solution; once according to molecule retention time followed by a second according to molecule size, or vice versa. In any implementations of the embodiment described in this paragraph, additional variants may include a mass spectrometer operatively positioned between the ion source stage $IS_2$ and the ELIT 14.

Figure 6B:
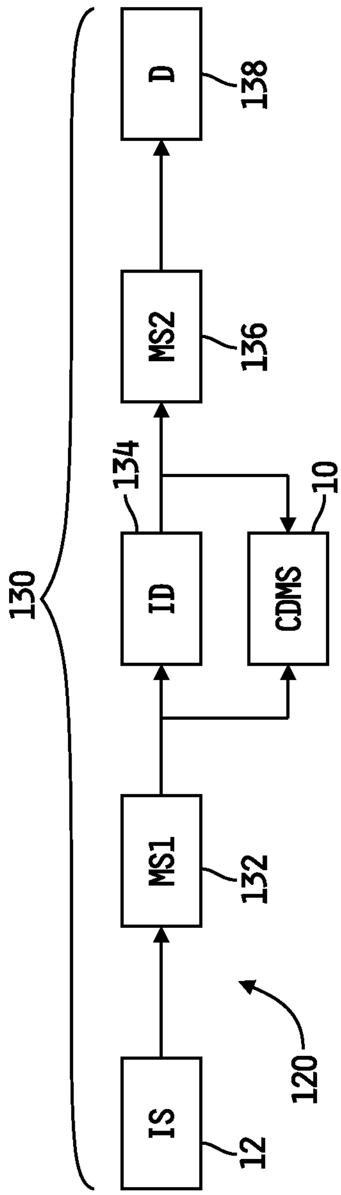
FIG. 6B is a simplified block diagram of another embodiment of an ion separation instrument including the ELIT illustrated and described herein and showing example implementation which combines conventional ion processing instruments with any of the embodiments of the ion mass detection system illustrated and described herein.

Referring now to FIG. 6B, a simplified block diagram is shown of another embodiment of an ion separation instrument 120 which illustratively includes a multi-stage mass spectrometer instrument 130 and which also includes the charge detection mass spectrometer (CDMS) 10 illustrated and described herein implemented as a high-mass ion analysis component. In the illustrated embodiment, the multi-stage mass spectrometer instrument 130 includes an ion source (IS) 12, as illustrated and described herein, followed by and coupled to a first conventional mass spectrometer (MS1) 132, followed by and coupled to a conventional ion dissociation stage (ID) 134 operable to dissociate ions exiting the mass spectrometer 132, e.g., by one or more of collision-induced dissociation (CID), surface-induced dissociation (SID), electron capture dissociation (ECD) and/or photo-induced dissociation (PID) or the like, followed by an coupled to a second conventional mass spectrometer (MS2) 136, followed by a conventional ion detector (D) 138, e.g., such as a microchannel plate detector or other conventional ion detector. The CDMS 10 is coupled in parallel with and to the ion dissociation stage 134 such that the CDMS 10 may selectively receive ions from the mass spectrometer 136 and/or from the ion dissociation stage 132.

MS/MS, e.g., using only the ion separation instrument 130, is a well-established approach where precursor ions of a particular molecular weight are selected by the first mass spectrometer 132 (MS1) based on their m/z value. The mass selected precursor ions are fragmented, e.g., by collision-induced dissociation, surface-induced dissociation, electron capture dissociation or photo-induced dissociation, in the ion dissociation stage 134. The fragment ions are then analyzed by the second mass spectrometer 136 (MS2). Only the m/z values of the precursor and fragment ions are measured in both MS1 and MS2. For high mass ions, the charge states are not resolved and so it is not possible to select precursor ions with a specific molecular weight based on the m/z value alone. However, by coupling the instrument 130 to the CDMS 10, it is possible to select a narrow range of m/z values and then use the CDMS 10 to determine the masses of the m/z selected precursor ions. The mass spectrometers 132, 136 may be, for example, one or any combination of a magnetic sector mass spectrometer, time-of-flight mass spectrometer or quadrupole mass spectrometer, although in alternate embodiments other mass spectrometer types may be used. In any case, the m/z selected precursor ions with known masses exiting MS1 can be fragmented in the ion dissociation stage 134, and the resulting fragment ions can then be analyzed by MS2 (where only the m/z ratio is measured) and/or by the CDMS instrument 10 (where the m/z ratio and charge are measured simultaneously). Low mass fragments, i.e., dissociated ions of precursor ions having mass values below a threshold mass value, e.g., 10,000 Da (or other mass value), can thus be analyzed by conventional MS, using MS2, while high mass fragments (where the charge states are not resolved), i.e., dissociated ions of precursor ions having mass values at or above the threshold mass value, can be analyzed by CDMS 10.

It will be understood that the dimensions of the various components of the ELIT 14 and the magnitudes of the electric fields established therein, as implemented in any of the systems 10, 100, 120 illustrated in the attached figures and described above, may illustratively be selected so as to establish a desired duty cycle of ion oscillation within the ELIT 14, corresponding to a ratio of time spent by an ion in the charge detection cylinder CD and a total time spent by the ion traversing the combination of the ion mirrors M1, M2 and the charge detection cylinder CD during one complete oscillation cycle. For example, a duty cycle of approximately 50% may be desirable for the purpose of reducing noise in fundamental frequency magnitude determinations resulting from harmonic frequency components of the measured signals. Details relating to such dimensional and operational considerations for achieving a desired duty cycle, e.g., such as 50%, are illustrated and described in U.S. Patent Application Ser. No. 62/616,860, filed Jan. 12, 2018, U.S. Patent Application Ser. No. 62/680,343, filed Jun. 4, 2018 and International Patent Application No. PCT/US2019/013251, filed Jan. 11, 2019, all entitled ELECTROSTATIC LINEAR ION TRAP DESIGN FOR CHARGE DETECTION MASS SPECTROMETRY, the disclosures of which are all expressly incorporated herein by reference in their entireties.

It will be further understood that one or more charge detection optimization techniques may be used with the ELIT 14 in any of the systems 10, 100, 120, e.g., for trigger trapping or other charge detection events. Examples of some such charge detection optimization techniques are illustrated and described in U.S. Patent Application Ser. No. 62/680,296, filed Jun. 4, 2018 and in co-pending International Patent Application No. PCT/US2019/013280, filed Jan. 11, 2019, both entitled APPARATUS AND METHOD FOR CAPTURING IONS IN AN ELECTROSTATIC LINEAR ION TRAP, the disclosures of which are both expressly incorporated herein by reference in their entireties.

It will be still further understood that the charge detection cylinder calibration or reset apparatus and techniques illustrated in the attached figures and described herein may be used in each of two or more ELITs and/or in each of two or more ELIT regions in applications which include at least one ELIT array having two or more ELITs or having two or more ELIT regions. Examples of some such ELITs and/or ELIT arrays are illustrated and described in U.S. Patent Application Ser. No. 62/680,315, filed Jun. 4, 2018 and in co-pending International Patent Application No. PCT/US2019/013283, filed Jan. 11, 2019, both entitled ION TRAP ARRAY FOR HIGH THROUGHPUT CHARGE DETECTION MASS SPECTROMETRY, the disclosures of which are both expressly incorporated herein by reference in their entireties.

It will be further understood that one or more ion source optimization apparatuses and/or techniques may be used with one or more embodiments of the ion source 12 as part of or in combination with any of the systems 10, 100, 120 illustrated in the attached figures and described herein, some examples of which are illustrated and described in U.S. Patent Application Ser. No. 62/680,223, filed Jun. 4, 2018 and entitled HYBRID ION FUNNEL-ION CARPET (FUNPET) ATMOSPHERIC PRESSURE INTERFACE FOR CHARGE DETECTION MASS SPECTROMETRY, and in co-pending International Patent Application No. PCT/US2019/013274, filed Jan. 11, 2019 and entitled INTERFACE FOR TRANSPORTING IONS FROM AN ATMOSPHERIC PRESSURE ENVIRONMENT TO A LOW PRESSURE ENVIRONMENT, the disclosures of which are both expressly incorporated herein by reference in their entireties.

It will be still further understood that any of the systems 10, 100, 120 illustrated in the attached figures and described herein may be implemented in or as part of systems configured to operate in accordance with real-time analysis and/or real-time control techniques, some examples of which are illustrated and described in U.S. Patent Application Ser. No. 62/680,245, filed Jun. 4, 2018 and co-pending International Patent Application No. PCT/US2019/013277, filed Jan. 11, 2019, both entitled CHARGE DETECTION MASS SPECTROMETRY WITH REAL TIME ANALYSIS AND SIGNAL OPTIMIZATION, the disclosures of which are both expressly incorporated herein by reference in their entireties.

It will be still further understood that in any of the systems 10, 100, 120 illustrated in the attached figures and described herein, the ELIT 14 may be replaced with an orbitrap, and that the charge detection cylinder calibration or reset apparatus and techniques illustrated in the attached figures and described herein may be used with such an orbitrap. An example of one such orbitrap is illustrated and described in U.S. Patent Application Ser. No. 62/769,952, filed Nov. 20, 2018 and in co-pending International Patent Application No. PCT/US2019/013278, filed Jan. 11, 2019, both entitled ORBITRAP FOR SINGLE PARTICLE MASS SPECTROMETRY, the disclosures of which are both expressly incorporated herein by reference in their entireties.

It will be yet further understood that one or more ion inlet trajectory control apparatuses and/or techniques may be used with the ELIT 14 of any of the systems 10, 100, 120 illustrated in the attached figures and described herein to provide for simultaneous measurements of multiple individual ions within the ELIT 14. Examples of some such ion inlet trajectory control apparatuses and/or techniques are illustrated and described in U.S. Patent Application Ser. No. 62/774,703, filed Dec. 3, 2018 and in co-pending International Patent Application No. PCT/US2019/013285, filed Jan. 11, 2019, both entitled APPARATUS AND METHOD FOR SIMULTANEOUSLY ANALYZING MULTIPLE IONS WITH AN ELECTROSTATIC LINEAR ION TRAP, the disclosures of which are both expressly incorporated herein by reference in their entireties.

While this disclosure has been illustrated and described in detail in the foregoing drawings and description, the same is to be considered as illustrative and not restrictive in character, it being understood that only illustrative embodiments thereof have been shown and described and that all changes and modifications that come within the spirit of this disclosure are desired to be protected. For example, it will be understood that the ELIT 14 illustrated in the attached figures and described herein is provided only by way of example, and that the concepts, structures and techniques described above may be implemented directly in ELITs of various alternate designs. Any such alternate ELIT design may, for example, include any one or combination of two or more ELIT regions, more, fewer and/or differently-shaped ion mirror electrodes, more or fewer voltage sources, more or fewer DC or time-varying signals produced by one or more of the voltage sources, one or more ion mirrors defining additional electric field regions, or the like. As another example, while the concepts, structures and/or techniques of this disclosure have been described as being implemented in an electrostatic linear ion trap (ELIT), it will be understood that such concepts, structures and/or techniques are not intended to be limited to ELITs or variants thereof, but rather are intended to be applicable to any conventional charge detector or charge detection apparatus. Accordingly, any conventional charge detector or charge detection apparatus implementing the concepts, structures and/or techniques illustrated in the attached figures and described herein are intended to fall within the scope of this disclosure.

What is claimed is:

1. A charge detection mass spectrometer (CDMS), comprising:

an ion source configured to generate ions from a sample, a mass spectrometer configured to separate the generated ions as a function of ion mass-to-charge ratio, an electrostatic linear ion trap (ELIT) having a charge detection cylinder disposed between first and second ion mirrors, wherein ions exiting the mass spectrometer are supplied to the ELIT, a charge generator for generating free charges, a field free region between the charge generator and the charge detection cylinder, and a processor configured to control operation of the first and second ion mirrors to trap at least one ion from the source of ions therein, and to thereafter cause the trapped at least one ion to oscillate back and forth between the first and second ion mirrors each time passing through the charge detection cylinder and inducing at least one corresponding charge thereon, and wherein the processor is configured to control the charge generator, with no ions in the charge detection cylinder, to generate a target number of free charges and cause the target number of free charges to travel across the field-free region and into contact with the charge detection cylinder to deposit the target number of free charges thereon and thereby calibrate or reset the charge detection cylinder to a corresponding target charge level.

2. The CDMS of claim 1, wherein the ELIT is configured and controlled such that at least one ion trapped therein oscillates back and forth through the charge detection cylinder between the first and second ion mirrors with a duty cycle, corresponding to a ratio of time spent by the at least one ion moving through the charge detection cylinder and a total time spent by the at least one ion traversing a combination of the first and second ion mirrors and the charge detection cylinder during one complete oscillation cycle, of approximately 50%.

3. The CDMS of claim 1, wherein the ELIT comprises a plurality of axially aligned charge detection cylinders each disposed between respective ion mirrors to form one of a corresponding plurality of cascaded ELIT regions, and wherein the processor is configured to control the ELIT to consecutively trap at least one of the generated ions in each of the plurality of ELIT regions.

4. The CDMS of claim 1, wherein the ELIT comprises a plurality of ELITs, and further comprising means for guiding ions exiting the mass spectrometer to each of the plurality of ELITs, and wherein the processor is configured to control the plurality of ELITs and the means for guiding ions from exiting the mass spectrometer to each of the plurality of ELITs to consecutively trap at least one ion in each of the plurality of ELITs.

5. An instrument for separating ions, comprising:

the CDMS of claim 1, and at least one ion processing instrument positioned between the ion source and the mass spectrometer, the at least one ion processing instrument positioned between the ion source and the mass spectrometer comprising one or any combination of at least one instrument for collecting or storing ions, at least one instrument for filtering ions according to a molecular characteristic, at least one instrument for dissociating ions, at least one instrument for normalizing or shifting ion charge states and at least one instrument for separating ions as a function of at least one molecular characteristic.

6. The instrument of claim 5, further comprising at least one ion processing instrument positioned between the mass spectrometer and the ELIT, the at least one ion processing instrument positioned between the mass spectrometer and the ELIT comprising one or any combination of at least one instrument for collecting or storing ions, at least one instrument for filtering ions according to a molecular characteristic, at least one instrument for dissociating ions, at least one instrument for normalizing or shifting ion charge states and at least one instrument for separating ions as a function of at least one molecular characteristic.

7. An instrument for separating ions, comprising:

the CDMS of claim 1, wherein the ELIT is configured to allow ion exit therefrom, and at least one ion separation instrument positioned to receive ions exiting the ELIT and to separate the receive ions as a function of at least one molecular characteristic.

8. The instrument of claim 7, further comprising at least one ion processing instrument positioned between the ELIT and the at least one ion separation instrument, the at least one ion processing instrument positioned between the ELIT and the at least one ion separation instrument comprising one or any combination of at least one instrument for collecting or storing ions, at least one instrument for filtering ions according to a molecular characteristic, at least one instrument for dissociating ions and at least one instrument for normalizing or shifting ion charge states.

9. The instrument of claim 7, further comprising at least one ion processing instrument positioned to receive ions exiting the at least one ion separation instrument, the at least one ion processing instrument positioned to receive ions exiting the at least one ion separation instrument comprising one or any combination of at least one instrument for collecting or storing ions, at least one instrument for filtering ions according to a molecular characteristic, at least one instrument for dissociating ions, at least one instrument for normalizing or shifting ion charge states.

10. An instrument for separating ions, comprising:

the CDMS of claim 1, wherein the ELIT is configured to allow ion exit therefrom, and at least one ion processing instrument positioned to receive ions exiting the ELIT, the at least one ion processing instrument positioned to receive ions exiting the ELIT comprising one or any combination of at least one instrument for collecting or storing ions, at least one instrument for filtering ions according to a molecular characteristic, at least one instrument for dissociating ions and at least one instrument for normalizing or shifting ion charge states.

11. An instrument for separating ions, comprising:

an ion source configured to generate ions from a sample, a first mass spectrometer configured to separate the generated ions as a function of mass-to-charge ratio, an ion dissociation stage positioned to receive ions exiting the first mass spectrometer and configured to dissociate ions exiting the first mass spectrometer, a second mass spectrometer configured to separate dissociated ions exiting the ion dissociation stage as a function of mass-to-charge ratio, and a charge detection mass spectrometer (CDMS) coupled in parallel with and to the ion dissociation stage such that the CDMS can receive ions exiting either of the first mass spectrometer and the ion dissociation stage, the CDMS comprising (i) at least one ion separation instrument configured to separate ions as a function of at least one molecular characteristic, (ii) an electrostatic linear ion trap (ELIT) having a charge detection cylinder disposed between first and second ion mirrors, wherein ions exiting the at least one ion separation instrument are supplied to the ELIT, (iii) a charge generator for generating free charges, (iv) a field free region between the charge generator and the charge detection cylinder, and (v) a processor configured to control the charge generator to generate a target number of free charges and cause the target number of free charges to travel across the field-free region and into contact with the charge detection cylinder to deposit the target number of free charges thereon and thereby calibrate or reset the charge detection cylinder to a corresponding target charge level, wherein masses of precursor ions exiting the first mass spectrometer are measured using the CDMS, mass-to-charge ratios of dissociated ions of precursor ions having mass values below a threshold mass are measured using the second mass spectrometer, and mass-to-charge ratios and charge values of dissociated ions of precursor ions having mass values at or above the threshold mass are measured using the CDMS.

12. A method of resetting or calibrating a charge detector of a charge detection mass spectrometer (CDMS), the charge detector including an electrostatic linear ion trap (ELIT) having a charge detection cylinder disposed between first and second ion mirrors, the method comprising:

controlling, with a processor, a charge generator to generate a target number of free charges, and accelerating the generated target number of free charges across a field-free region defined between the charge generator and the charge detection cylinder and into contact with the charge detection cylinder to deposit the target number of free charges thereon and thereby calibrate or reset the charge detection cylinder to a corresponding target charge level.

13. The method of claim 12, wherein accelerating the generated target number of free charges across the field free region comprises controlling, with the processor, a voltage source coupled to the charge generator to selectively produce a potential to establish a charge accelerating electric field outside of the field free region, the charge accelerating electric field oriented to accelerate the generated target number of free charges into the field free region and toward the charge detection cylinder.

14. The method of claim 12, wherein the ELIT is configured to trap at least one ion therein such that the at least one ion oscillates back and forth between the first and second ion mirrors each time passing through the charge detection cylinder and inducing at least one corresponding charge thereon, and wherein controlling the charge generator to generate the target number of free charges comprises controlling the charge generator to generate the target number of free charges following each pass of the at least one ion through the charge detection cylinder as the at least one ion is within a respective one of the first and second ion mirrors to thereby calibrate or reset the charge detection cylinder between each pass of the ion therethrough.

15. The method of claim 12, wherein the charge detector includes a charge preamplifier having an input coupled to the charge detection cylinder and an output coupled to the processor, the charge preamplifier configured to be responsive to a charge induced on the charge detection cylinder by an ion passing therethrough to produce a charge detection signal, wherein controlling the charge generator to generate the target number of free charges comprises controlling the charge generator to generate the target number of free charges upon each detection of an absence of the charge detection signal at the output of the charge preamplifier.

16. The method of claim 15, wherein no feedback component is electrically connected between the input and the output of the charge preamplifier, and wherein the method further comprises selecting the target number of free charges such that the target number of free charges deposited on the charge detection cylinder clears an amount of charge noise accumulated on the charge detection cylinder by charges induced thereon resulting from the trapped ions passing therethrough, thereby resetting the charge detection cylinder and the charge preamplifier to repeatable respective operating states.

17. The method of claim 12, wherein the at least one trapped ion oscillates back and forth between the first and second ion mirrors for an ion measurement event duration defined by a predefined time duration or a predetermined number of oscillations, and following the ion measurement event duration the at least one ion exits the ELIT, and wherein controlling the charge generator to generate the target number of free charges comprises controlling the charge generator to generate the target number of free charges following exit of the at least one ion from the ELIT.

18. The method of claim 12, wherein the CDMS further includes an ion source configured to generate ions from a sample and at least one ion separation instrument configured to separate the generated ions as a function of at least one molecular characteristic, and wherein ions exiting the at least one ion separation instrument are supplied to the ELIT, and wherein the method further comprises processing ions exiting the ion source with at least one ion processing instrument and supplying the processed ions to the at least one ion separation instrument, the at least one ion processing instrument configured to at least one of collect ions, store ions, filter ions according to a molecular characteristic, dissociate ions, normalize ions and shift ion charge states.

19. The method of claim 12, wherein the CDMS further includes an ion source configured to generate ions from a sample and at least one ion separation instrument configured to separate the generated ions as a function of at least one molecular characteristic, and wherein ions exiting the at least one ion separation instrument are supplied to the ELIT, and wherein the method further comprises processing ions exiting the at least one ion separation instrument with at least one ion processing instrument and supplying the processed ions to the ELIT, the at least one ion processing instrument configured to at least one of collect ions, store ions, filter ions according to a molecular characteristic, dissociate ions, normalize ions and shift ion charge states.

20. The method of claim 12, wherein the CDMS further includes an ion source configured to generate ions from a sample and at least one ion separation instrument configured to separate the generated ions as a function of at least one molecular characteristic, and wherein ions exiting the at least one ion separation instrument are supplied to the ELIT, and wherein the ELIT is configured to allow ions to exit therefrom, and wherein the method further comprises processing ions exiting the ELIT with at least one ion processing instrument, the at least one ion processing instrument configured to at least one of collect ions, store ions, filter ions according to a molecular characteristic, dissociate ions, normalize ions and shift ion charge states.

21. The method of claim 12, wherein the CDMS further includes an ion source configured to generate ions from a sample and at least one ion separation instrument configured to separate the generated ions as a function of at least one molecular characteristic, and wherein ions exiting the at least one ion separation instrument are supplied to the ELIT, and wherein the ELIT is configured to allow ions to exit therefrom, and wherein the method further comprises separating ions exiting the ELIT with at least another ion separation instrument configured to separate ions as a function of at least one molecular characteristic.

22. The method of claim 21, further comprising processing ions exiting the ELIT with at least one ion processing instrument and supplying the processed ions to the at least another ion separation instrument, the at least one ion processing instrument configured to at least one of collect ions, store ions, filter ions according to a molecular characteristic, dissociate ions, normalize ions and shift ion charge states.

23. The method of claim 21, further comprising processing ions exiting the at least another ion separation instrument with at least one ion processing instrument, the at least one ion processing instrument configured to at least one of collect ions, store ions, filter ions according to a molecular characteristic, dissociate ions, normalize ions and shift ion charge states.

* * * * *